(12) United States Patent
Spendlove

(10) Patent No.: US 11,001,341 B2
(45) Date of Patent: May 11, 2021

(54) WAKESURF SYSTEM

(71) Applicant: Jared Spendlove, South Weber, UT (US)

(72) Inventor: Jared Spendlove, South Weber, UT (US)

( * ) Notice: Subject to any disclaimer, the term of this patent is extended or adjusted under 35 U.S.C. 154(b) by 0 days.

(21) Appl. No.: 16/358,594

(22) Filed: Mar. 19, 2019

(65) Prior Publication Data

US 2019/0210693 A1    Jul. 11, 2019

(51) Int. Cl.
*B63B 1/28* (2006.01)
*B63B 1/32* (2006.01)
*B63B 32/70* (2020.01)
*B63B 34/70* (2020.01)

(52) U.S. Cl.
CPC .............. *B63B 1/286* (2013.01); *B63B 1/32* (2013.01); *B63B 32/70* (2020.02); *B63B 34/70* (2020.02); *B63B 2001/325* (2013.01)

(58) Field of Classification Search
CPC .... B63B 1/00; B63B 1/02; B63B 1/16; B63B 1/24; B63B 1/242; B63B 1/248; B63B 1/26; B63B 1/28; B63B 2001/281; B63B 1/30; B63B 1/32; B63B 35/73; B63B 35/85; B63B 38/00; B63B 2001/00; B63B 2001/32; B63B 2001/325; B63B 2017/00; B63B 2035/00; B63B 2035/73; B63B 2035/737; B63B 2035/85; B63B 2035/855; B63B 2039/00; B63B 2039/06; B63B 2039/065; B63B 17/00; B63B 2017/009; B63B 2221/20; B63B 2221/22; B63B 2231/30

USPC ................. 114/271, 274–282, 284, 285
See application file for complete search history.

(56) References Cited

U.S. PATENT DOCUMENTS

| | | | |
|---|---|---|---|
| 7,252,047 B1 * | 8/2007 | Baucom, Jr. ............ | B63B 32/70 114/284 |
| 8,539,897 B1 | 9/2013 | Gasper et al. | |
| 8,578,873 B2 * | 11/2013 | Gasper ..................... | B63B 1/32 114/284 |
| 9,260,161 B2 | 2/2016 | Gasper et al. | |
| 9,334,022 B2 | 5/2016 | Gasper et al. | |
| 9,802,684 B2 * | 10/2017 | Sheedy .................... | B63B 32/70 |
| 9,891,620 B2 * | 2/2018 | Green ................... | G05D 1/0016 |
| 9,914,509 B1 | 3/2018 | Tegeder | |
| 9,988,126 B2 * | 6/2018 | Wood ........................ | B63B 1/22 |
| 10,059,404 B2 | 8/2018 | Clover et al. | |

(Continued)

*Primary Examiner* — Daniel V Venne
(74) *Attorney, Agent, or Firm* — David A. Jones; Alpine IP PLLC

(57) ABSTRACT

Wakesurf systems for improving and enlarging the wake behind a boat for wakesurfing. A wakesurf system can include a bracket configured to be attached to the hull of a boat. The bracket can be adhered to the hull. The wakesurf system can further include a magnetic connection between the bracket and a base of a wake forming assembly. The wake forming assembly may be collapsible and expandable. The wake forming assembly can including a base structure with a connector for attaching the base structure to the bracket when attached to the hull of the boat. The wake forming assembly can further include a water diverter pivotably attached to a second surface of the base structure and supports disposing the water diverter at an angle to the hull of the boat when the base structure is attached to the bracket and the wake forming assembly is in an expanded position.

13 Claims, 19 Drawing Sheets

(56) References Cited

U.S. PATENT DOCUMENTS

| | | |
|---|---|---|
| 10,179,268 B2 * | 1/2019 | Fossum .................. A63B 60/00 |
| 10,183,726 B1 | 1/2019 | McNaughton |
| 10,358,189 B2 * | 7/2019 | Sheedy .................. B63B 32/70 |
| 2014/0261135 A1 | 9/2014 | Gasper et al. |
| 2016/0009342 A1 | 1/2016 | Thomas |

* cited by examiner

WAKESURF SYSTEM

BACKGROUND OF THE INVENTION

The present invention relates to improvements in wake sport technology, in particular improvements to wake characteristics favorable to the sport of wakesurfing. Wakesurfing is a wake sport in which a rider rides upon a wake formed behind a boat. After often being initially towed by the boat, the wakesurfer rides the surface of boat's wake without being directly pulled by the boat. After getting up on the wake, typically by use of a tow rope, the wakesurfer will drop the rope and ride the steep face of the wake below the wave's peak in a fashion reminiscent of surfing. Wakesurfers generally use special boards, designed specifically for wakes.

A wakesurfing wake can be created without a surf system but this requires a large amount of weight to be placed on one side of the boat, thus listing the boat to one side. This displaces a large amount of water on the surfing side of the boat and reduces the flow of water on the opposite side of the boat. Most wake sport specific inboard engine boats have multiple integrated ballast tanks that are filled with ballast pumps controlled from the helm. Typically the configuration is based on a three tank system with a tank in the center of the boat and two additional ballast tanks disposed in the rear of the boat on either side of the engine compartment. Just like larger boats and ships when adding water ballast to smaller wakeboard boats the hull has a lower center of gravity, and increases the draft of the boat. However, this can make steering the boat more difficult. And, with particular regard to wakesurfing, this can require a significant amount of time to empty one side of the water ballasts and fill up the other side when switching the side of the boat which is being surfed on.

Boat manufacturers have adapted to the increase in popularity of wakesurfing by making boats with surf systems installed onto the boat. Many wake sport boat factory ballast systems can be upgraded with larger capacities by adding soft structured ballast bags. In some instances additional ballast bags may be added to compartments on each side of the motor of a boat. In some instances ballasts may be even added within the interior of the boat to add additional draft and increase the size and attributes of the boat's wake for wakesurfing. However, the addition of additional ballasts within a boat consumes storage space and may be otherwise inconvenient to the passengers therein. For example, in many instances the non-participating passengers of the boat may even alternate seating positions within the boat so as to add additional weight to one side of the boat, as opposed to the other side of the boat, depending on the side of the wake for which the wakesurfing is being performed.

The boats with built-in surf systems are costly and the systems are generally either hydraulic or electric. To change the shape of the wake, the surf systems can deflect water from either the port or stern side of the boat. Another method is by using paddles attached to the transom. Aftermarket products exist that can be attached to the transom, starboard, or port side of the boat which deflect water from one side of the boat creating a large wake on the opposite side of the boat, or by listing the boat to one side, or other methods. These aftermarket products are either entirely removable or may be temporarily attached to the hull of the boat.

Directed to this end, several designs exist which each is defined by several important and distinct limitations. For example, U.S. Publication US 2016/0009342 A1 published Jan. 14, 2016 is directed to a Wake Surf Shaper. The wake surf shaper can be used to modify the wake of a watercraft to make it more "surfable." The publication removably attaches the wake surf shaper to one side of a boat's hull which interrupts the flow of water diverted around one side of the bow applying force to the hull in such a manner as to dam the column of water diverted around the opposite side of the bow such that the release of water creates an increased wake behind the boat. At least one embodiment describes a wake surf shaper which has a hull attachment surface which extends substantially from bow to stern at or near the water line. Such wake surf shapers include an outer surface which interrupts the flow of water diverted around one side of the bow, with substantially symmetrical top and bottom surfaces configured to fit the space between the hull attachment side and the outer surface, a rear surface, and a hook and loop means such as VELCRO for removably attaching the hull attachment surface to the hull of the boat.

U.S. Pat. No. 10,059,404 B2 issued Aug. 28, 2018 and U.S. Pat. No. 10,183,726 B1 issued Jan. 22, 2019 are additional examples which each disclose a wake diverter and wake shaping apparatus and related technology respectively. Both patent documents are related to a device that attaches to a hull of a boat using suction cups. The devices disrupt water flow around the hull such that a wake created behind the boat modify the characteristics of the wake, such as making the wake larger, differently positioned, and/or differently shaped.

All of the aforementioned designs suffer from a lack of security in the mount design by which the devices are attached to the hull of a boat. Moreover, such devices suffer from an inherent lack of collapsibility for easy storage, complexity of design, floatation of the diverter, and/or a lack of adjustability by which the wake characteristics are modified. These shortcomings, as well as other shortcomings, in design, manufacture, and use will become apparent to one of ordinary skill in the art in view of the following disclosure herein as to one upon use of the applicant's disclosed embodiments as illustrated in the accompanying figures illustrating the applicant's designs and use thereof.

With reference to a boat, various terms are commonly known and used herein. For example, as referred to herein the following well-known terms are defined: abaft (preposition): at or toward the stern of a ship, or further back from a location; aft (adjective): toward the stern (rear) of a ship; aport: toward the port side of a ship (opposite of "astarboard"); astarboard: toward the starboard side of a ship (opposite of "aport"); astern (adjective): toward the rear of a ship (opposite of "forward"); athwartships: toward the sides of a ship; bottom: the lowest part of the ship's hull; bow or stem: front of a ship (opposite of "stern"); centerline or centerline: an imaginary, central line drawn from the bow to the stern; fore or forward: at or toward the front of a ship or further ahead of a location (opposite of "aft"); inboard: attached inside the ship; keel: the bottom structure of a ship's hull; port: the left side of the ship, when facing forward (opposite of "starboard"); starboard: the right side of the ship, when facing forward (opposite of "port"); stern: the rear of a ship (opposite of "bow"); and waterline: where the water surface meets the ship's hull.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Wakesurf systems are disclosed herein for improving and enlarging the wake behind a boat for wake surfing. An example of a wakesurf system can include a bracket configured to be attached to the hull of a boat. In some embodiments, the bracket can be adhered to the hull.

The wakesurf system can further include a magnetic connection between the bracket and a base of a wake forming assembly. The wake forming assembly may be collapsible and expandable. The wake forming assembly can include a base structure including a first surface having connector for attaching the base structure to the bracket when attached to the hull of the boat. The wake forming assembly can further include a water diverter pivotably attached to a second surface of the base structure. The wake forming assembly can further include one or more braces positioned between the base structure and the water diverter. The base structure supports the water diverter at an angle to the hull of the boat when the base structure is attached to the bracket and the wake forming assembly is in an expanded position.

The one or more braces can be moveable between a plurality of positions. Each position can change the angle of the water diverter relative to the base structure. The braces can be movable to a collapsed position. In the collapsed position, the water diverter being placed against the base structure and parallel thereto. The braces can include two or more positions that change the angle of the water diverter within a range between 15 and 90 degrees relative to the base structure.

The attachment between base and the bracket can a snap connection, buckle connection, or a magnetic connection, or a combination thereof. For example, according to some advantageous embodiments, the connector includes a magnetic connection between the bracket and the base structure. The connection can include a mechanical connection between the bracket and the base structure. The mechanical connection can include an interlocking mechanical feature disposed at a front edge of the bracket. According to some embodiments, the interlocking mechanical feature fits around and interlocks with a front of the base structure such that the front of the base structure is mechanically secured to the bracket during use.

The bracket can further include a rear appendage extending substantially perpendicular to an upper surface of the bracket. The rear appendage can be biased against a rear end surface of the base structure during use.

The base structure can be releasable from the bracket by pivoting the base structure about the front interlocking mechanical feature of the bracket to disconnect the magnetic connection between the a metallic part of the bracket and a magnet within or affixed to the base structure, thereby releasing the base structure from the rear appendage and allowing the base structure to be removed from the interlocking mechanical feature disposed at the front edge of the bracket.

The bracket can include a metallic strut and the base structure can include a magnet for temporarily connecting the bracket to the base structure. The metallic strut of the bracket can be encapsulated in a plastic formed over the metallic strut. The base structure can include a plastic encapsulated magnet for releasably connecting the base structure to the bracket.

The bracket can include a front end and a rear end, the front end including a clasp for mechanically securing a front end of the water base structure thereto.

An embodiment of a wakesurf system can include a bracket configured to be attached to the hull of a boat. The bracket can include a metallic strut, a front mechanical clasp, and a rear appendage. The wakesurf system can include a collapsible and expandable wake forming assembly. The wake forming assembly including a base structure. The base structure can include a connector for attaching the base structure to the bracket when attached to the hull of the boat. The base structure can further include a front portion configured to mate with the front mechanical clasp of the bracket. The base structure can include a magnet configured to mate with the metallic strut thereby aligning and holding the base structure against the bracket when placed thereto. The base structure can further include a rear surface configured to be placed and biased against the rear appendage of the bracket during use.

In another embodiment, the bracket can include a magnet configured to mate with a metallic portion of the base structure thereby aligning and holding the base structure against the bracket when placed thereto. And, similar to the previous design, the bracket can further include a rear surface configured to be placed and biased against a rear appendage of the bracket during use. Thus, features of the bracket may be implemented in the design of the base structure, and features of the base structure may be implemented in the design of the bracket.

The wakesurf system can further include a water diverter pivotably attached to a second surface of the base structure and one or more braces positioned between the base structure and the water diverter. The base structure supports the water diverter at an angle to the hull of the boat when the base structure is attached to the bracket and the wake forming assembly is in an expanded position. The one or more braces can be moveable between a plurality of positions and each position changes the angle of the water diverter relative to the base structure. The braces are movable to a collapsed position, in the collapsed position, the water diverter being placed against the base structure and parallel thereto thereby substantially reducing a width and displaceable volume of the wake forming assembly for storage.

Methods of wakesurfing and methods of installing a wakesurf system are disclosed as well as methods of making a wakesurfing system portable are disclosed. A method of installing a wakesurf system can include adhering a substantially rigid bracket to a side of a hull of a boat. The rigid bracket can include a metallic strut. The method can further include connecting a wake forming assembly to the bracket, the wake forming assembly including a magnetic element. The bracket including a interlocking mechanical feature for mechanically connecting to a base of the wake forming assembly.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Figure 7:
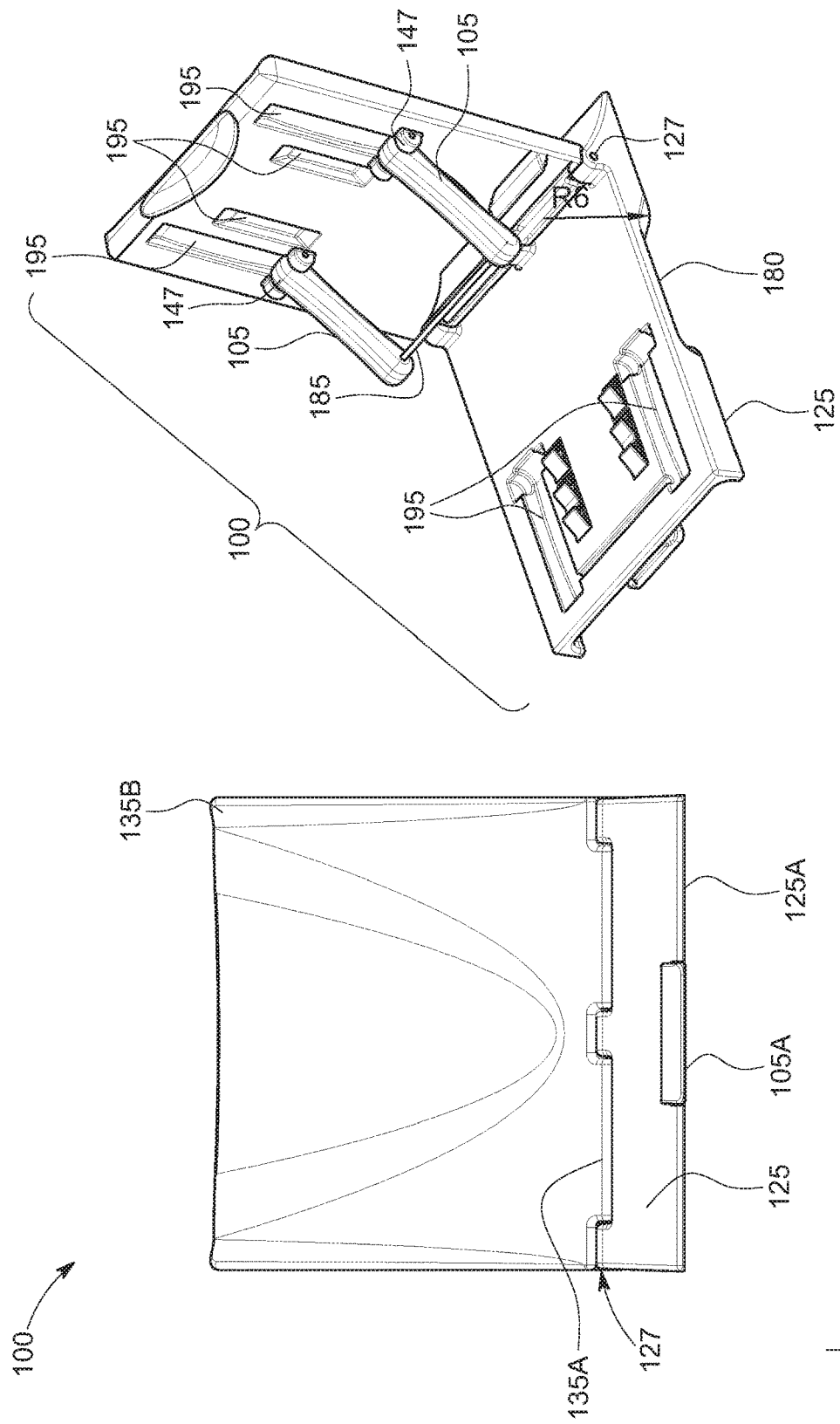
Figure 8:
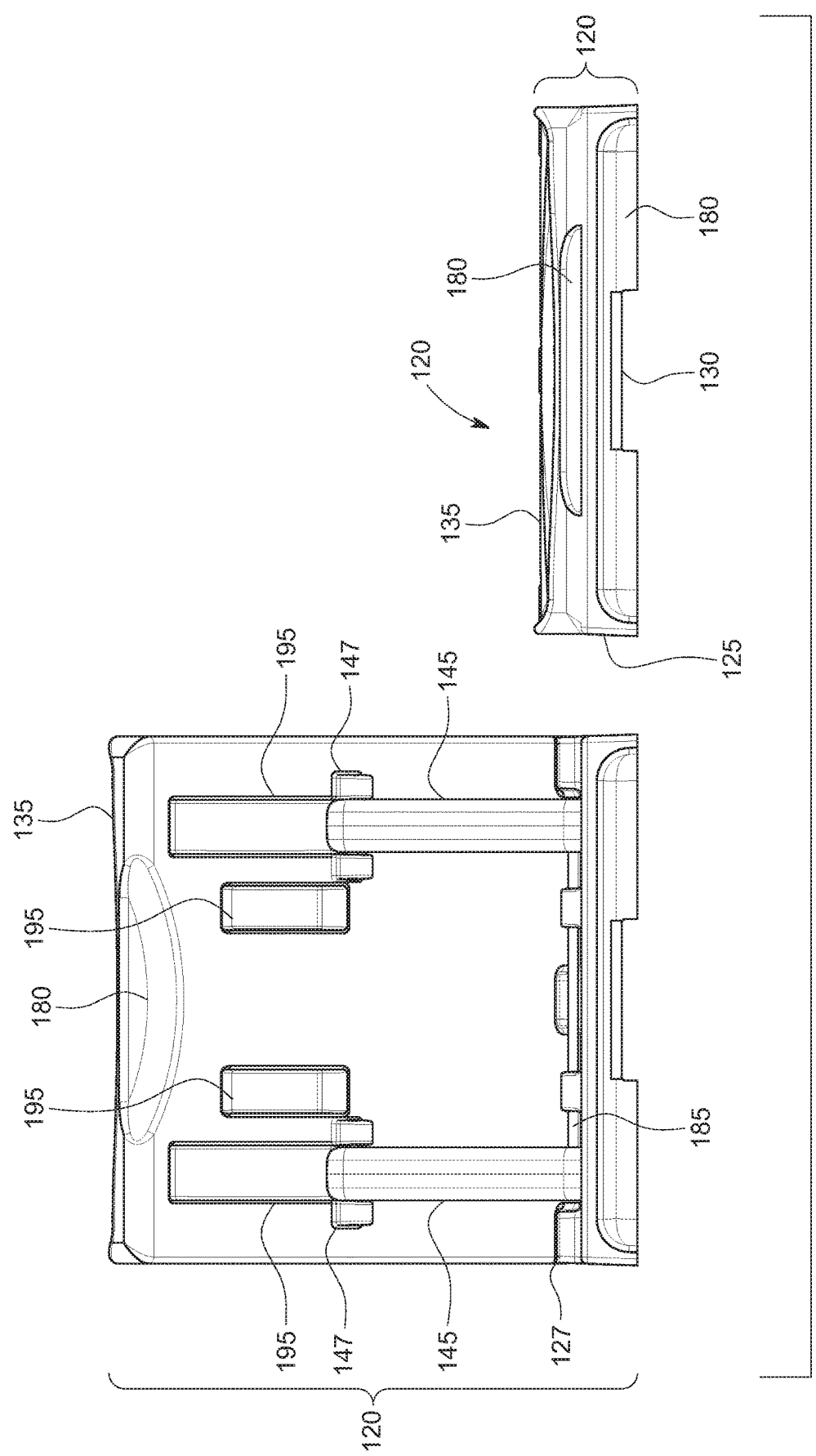
Figure 9:
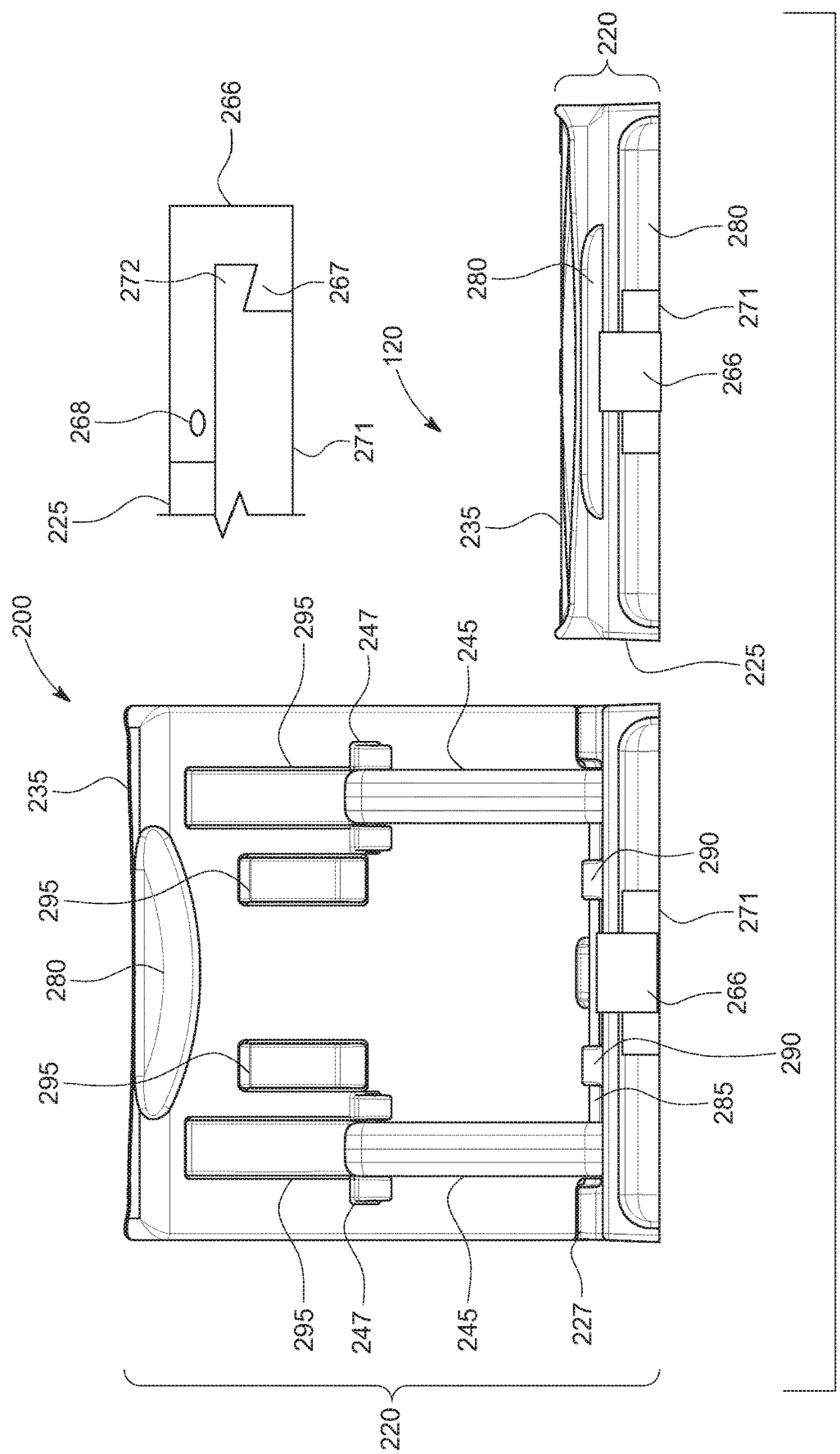
Figure 10:
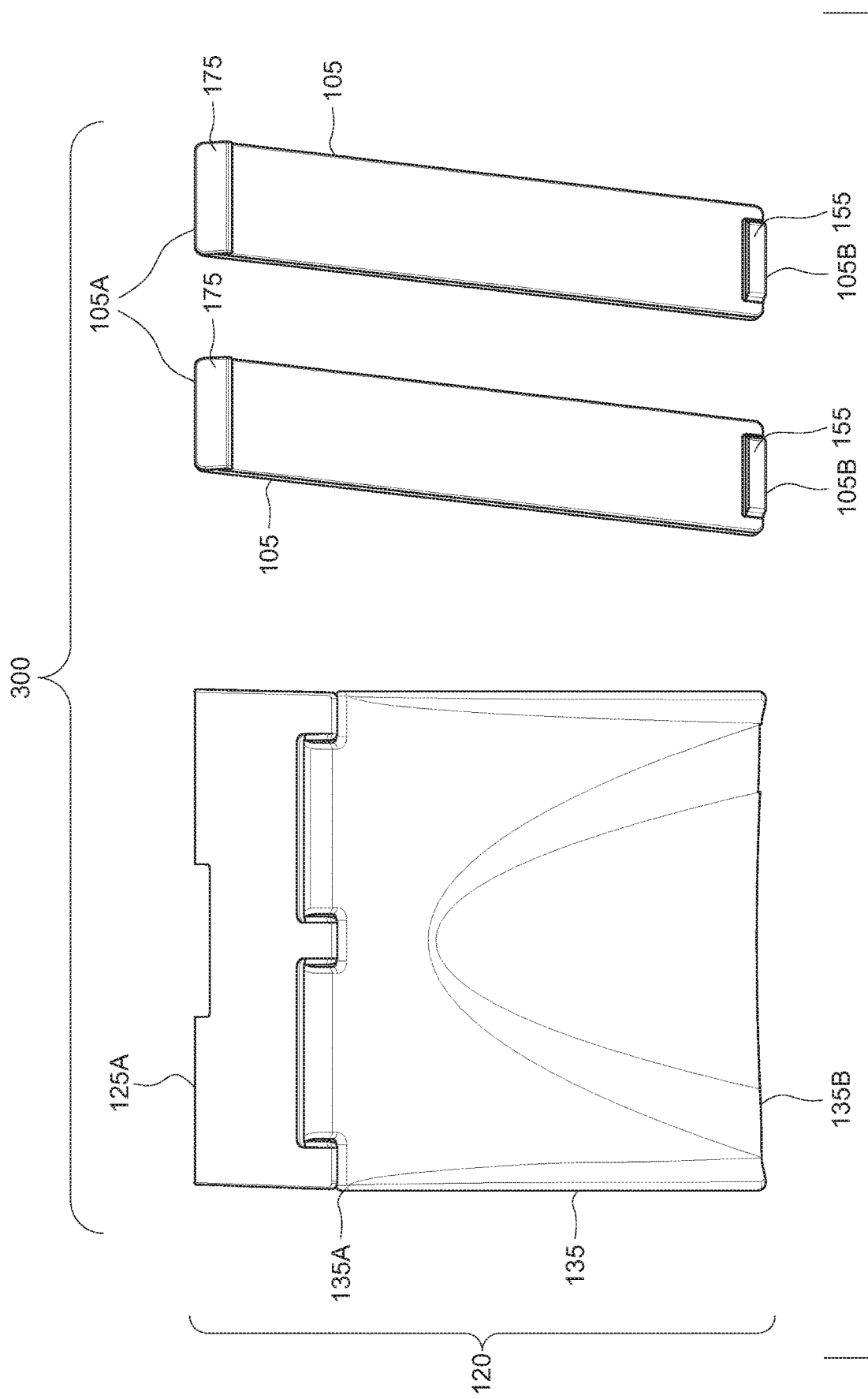
Figure 15:
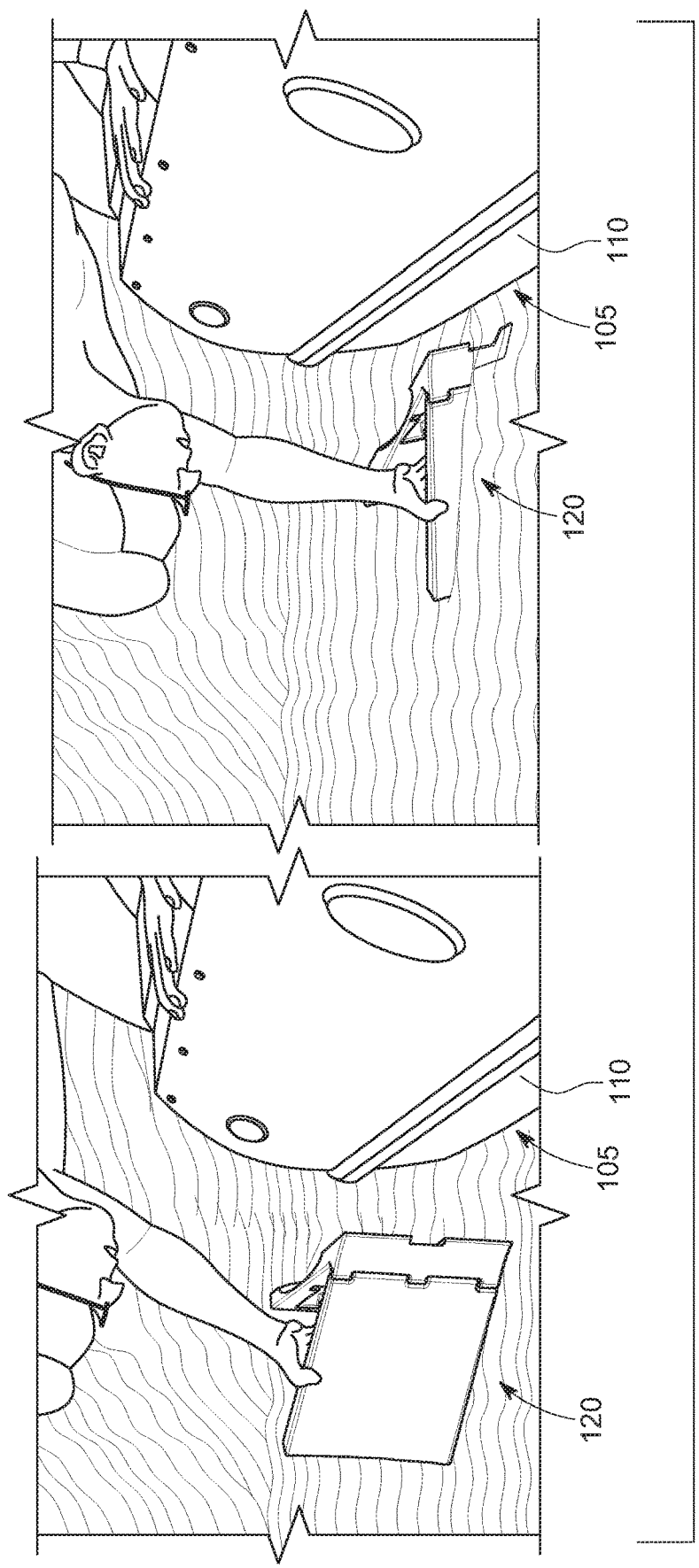
Figure 16:
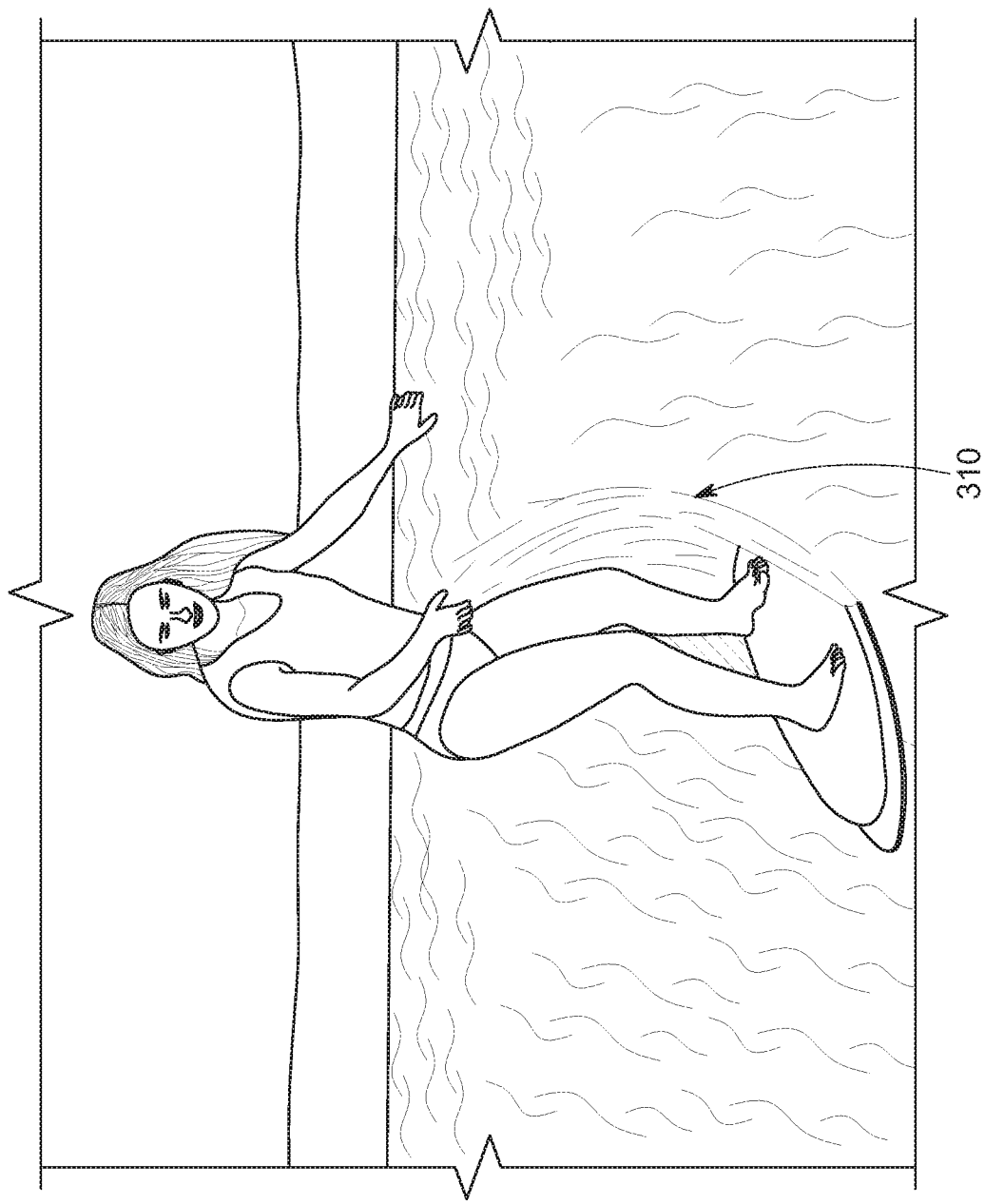
Figure 17:
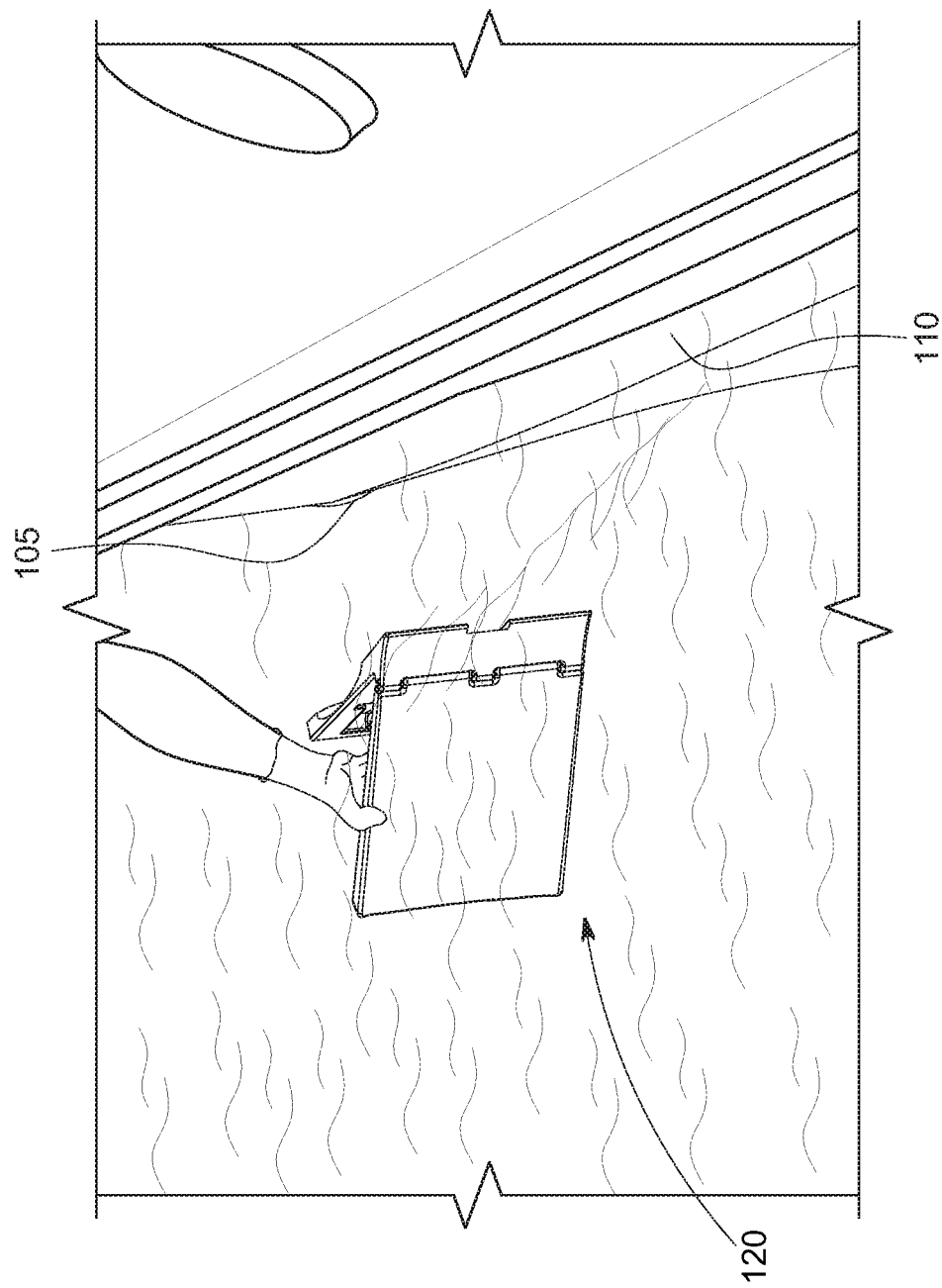
Figure 18:
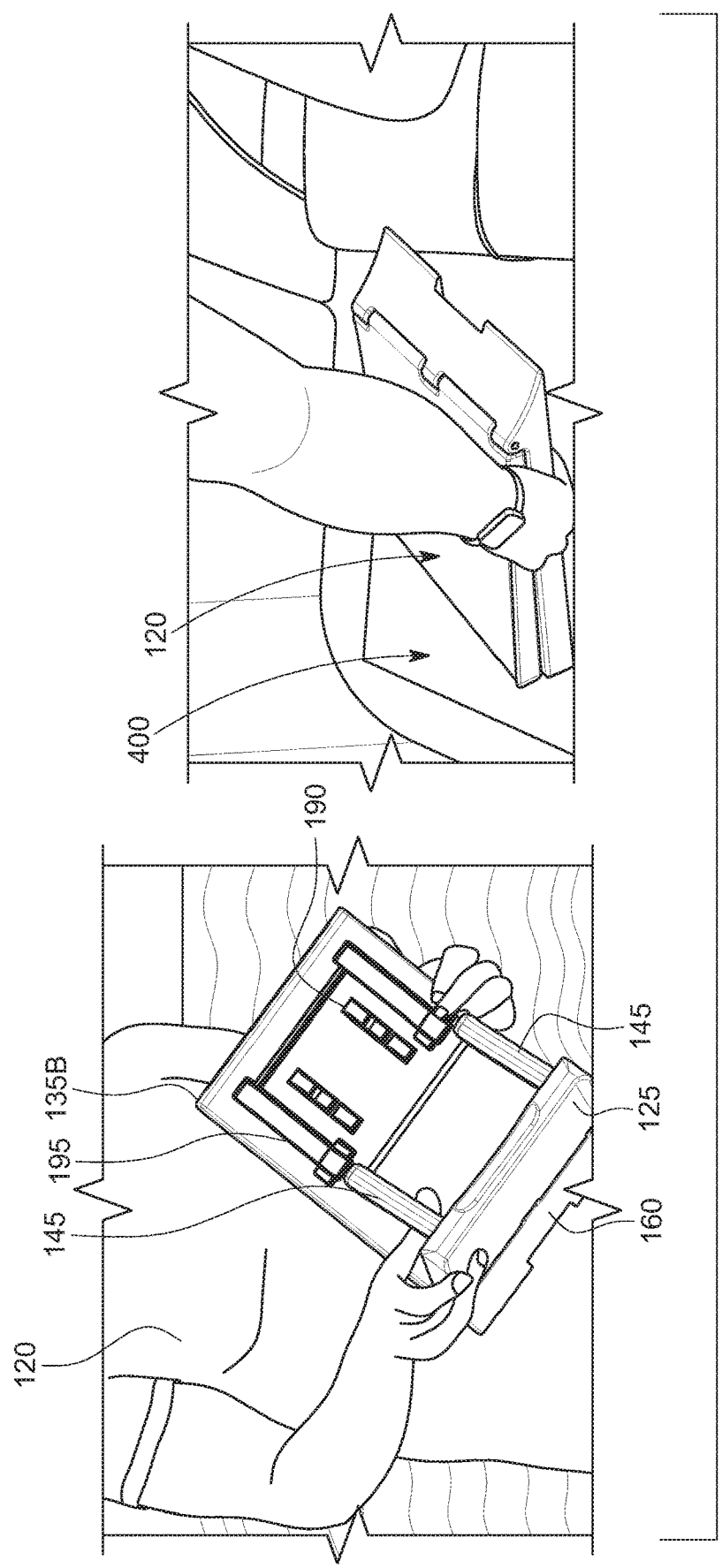

6B illustrates the bottom of the base structure at the top-left, the bracket at the bottom-left, and a cross-sectional view of the wakesurf system on the right showing connection of the base structure to the bracket according to an alternative embodiment of the invention;

FIG. 7 shows the front and rear of the wakesurf system in expanded views;

FIG. 8 illustrates the rear of the wake forming assembly in an expanded view on the left and collapsed view on the right;

FIG. 9 illustrates an example of a wakesurf system where a latch can be used to mechanically connect a rear of a base structure of a wake forming assembly to a bracket;

FIG. 10 illustrates a wakesurf system including a wake forming assembly and two brackets for attaching to opposing sides of the hull of a boat;

FIGS. 11-14 illustrate a method of attaching the bracket of a wakesurf system to the hull of a boat;

FIG. 15 illustrates connection of the wake forming assembly to the bracket affixed to the hull of the boat while the boat is afloat;

A comparison in wake conditions and size using the wakesurf system exhibits a vast improvement;

For example, FIG. 16 illustrates a person wakesurfing in the improved wake conditions;

FIG. 17 illustrates a person disconnecting the wake forming assembly from the bracket affixed to the hull of the boat; and FIG. 18 shows a person collapsing the wake forming assembly and stowing the wake forming assembly in a compartment under a rear seat of the boat.

DETAILED DESCRIPTION OF THE PREFERRED EMBODIMENTS

Embodiments of the disclosed invention relate to systems for improving the wake conditions for wake sports, in particular improving the wake conditions for wakesurfing. Wakesurf systems for watercraft disclosed herein deflect, redirect, or otherwise modify the flow of water around the hull of a boat thus changing the characteristics of the wake produced by the watercraft when moving through water. The wakesurf systems disclosed herein allow for improvements in formation of the wake for wakesurfing having superior characteristics such as height, size, shape, and smoothness of the wake's surfaces for wakesurfing. Smoothness of water surface can include a lack of roughness or lack of air within the wake resulting a lack of "white water," for example.

The wakesurf systems disclosed herein can also exhibit improvements in collapsibility and portability. The wakesurf systems can provide for improvements in secure connectability and disconectability to the hull of a boat. The connection of a wakesurf system to the hull according to the present invention can be more secure with a lower likelihood of being inadvertently detached from the hull during use.

The wakesurf systems can provide for improvements in methods of use including simplified and intuitive connection to, and disconnection from, the hull of a boat. This intuitive connection can be further enhanced using a magnetic attraction and connection between complementing components thereof. Connection of such surf systems to the hull of the boat may be easily accomplished prior to launching the boat, or even while the boat is afloat. Generally, the collapsible portions of the wakesurf system should not be left attached to the bracket until use for wakesurfing so as to prevent the wakesurf system from inadvertently detaching from the boat. Therefore, it may be recommended to only attach the base structure to the bracket just prior to launching the boat or just prior to wakesurfing when the boat is afloat. The wakesurf systems can be substantially portable and collapsible prior to, and after, use as compared to other devices.

A wakesurfing system can include two brackets for connection to opposing sides (i.e. port and starboard sides) of a boat. A wake forming assembly can be interchangeably connected to one of each of the two brackets on opposing sides of the boat for modifying the attributes of the wake for wake surfing. For example, the wake forming assembly can be connected to a first bracket affixed to the port side of the boat for improving the conditions of the wake on the corresponding starboard side of the wake. The wake forming assembly may be detached from the first bracket and moved to the second bracket affixed to the starboard side of the boat and connected thereto for improving conditions of the wake on the side of the wake corresponding to the port side of the boat. This change in wake surface characteristics can be accomplished without the repositioning of passengers within the boat and in some embodiments without a change in ballast settings.

It is still often recommended to use ballasts even with surf systems disclosed herein. The more water the boat displaces, the larger the wave created by the surf system. With the surf system, this just a user to fill up the ballasts equally so they don't have to have passengers change sides Prior to use, and after use, the wake forming assembly can be collapsed into a substantially reduced (e.g. flat and folded) width whereby a water diverter portion is placed substantially co-linear with and parallel to a base structure thereby substantially reducing the width thereof for improved portability and storage thereof. Braces previously holding the base structure at an angle to the water diverter can be collapsed within voids formed within a second lower surface of the water diverter and a first upper surface of the base structure holding the braces therein so as to further reduce the dimensions of the wake forming assembly when not in use.

The wake forming assembly can also be adjustable. For example, the wake forming assembly can have variable displaceable volume and water redirection configurations. One or more braces can be disposed between the base structure and water diverter of the wake forming assembly. Such braces can be pivotable relative to the base structure and/or water diverter and interlockable to provide multiple different usable latch features so as to vary the angle of the water diverter relative to the base structure during use. For example, the water diverter may be selectively placed at a pivotable angle between 15 and 90 degrees relative to the base structure of the wake forming assembly. In some embodiments, the base structure can have a plurality of latch features for securing the one or more braces pivotally connected to the water diverter thereby securing the water diverter at an angle between 20 and 45 degrees relative to the base structure.

Portions of the wakesurf system can be manufactured from a rigid closed-cell polyurethane foam in some embodiments, as opposed to being injection molded, so as to float although other materials including injection molded embodiments and other materials and manufacture methods may be implemented. This buoyant attribute can allow the wake forming assembly to float if dropped or detached from the bracket.

According to a method of using the wake surf system, one or more (preferably two) brackets can be affixed to opposing sides of the hull of a boat. The brackets can be placed at a position of the hull such that a waterline of a body of water relative to the boat lies approximately at or near the top of the water diverter of the wake forming assembly during use. The one or more brackets can include a double-stick tape or other means for securing the bracket on a side of the hull of the boat. Each bracket can include an internally encapsulated metallic strut that is magnetically attracted to a magnet of the base structure of a collapsible and expandable wake forming assembly. The magnet can be held within the bracket and a metallic strut placed within the base structure according to other embodiments. According to other embodiments, a clip or latch may also be used to mechanically and releasably attach the base structure to the bracket as discussed and illustrated herein.

The bracket can include an interlocking mechanical feature disposed at a front end thereof (i.e. fore end or bow relative to the boat when affixed thereto). The interlocking mechanical feature of the bracket can be a static clasp configured to receive a front interlocking mechanical feature of the base structure of the wake forming assembly. Upon placement of the front interlocking mechanical feature of the base structure into the interlocking mechanical feature of the bracket, the base structure is rotated relative thereto so as to magnetically connect the base structure to the bracket due to the magnetic attraction between the encapsulated metallic strut of the bracket with the magnet disposed within (e.g. encapsulated within) the base structure of the wave forming assembly.

The bracket can further include a rear perpendicular appendage relative to an upper surface thereof. When the base structure of the wake forming assembly is rotated relative to the front interlocking mechanical feature of the bracket, the rear of the base structure is placed forward of the rear appendage of the bracket and magnetically snaps into place due to the magnetic attraction between the metallic strut of the bracket and the magnet of the base structure of the wake forming assembly. This rear appendage of the bracket can be substantially perpendicular to, or at a slight forward acute angle to, the upper surface of the bracket such that the rear appendage is securely seated against the rear surface of the base structure of the wake forming assembly during use.

After, or before, the wake forming assembly is attached to the bracket, the wave diverter may be pivotally angled relative to the base structure. Braces disposed between the base structure and water diverter of the wake forming assembly are latched in place so as to place the wave diverter at the desired angle relative to the base structure. During use, a wakesurfer is initially pulled at approximately 8 to 12 miles per hour, although some wakesurfers also slide off the back of the boat or jump off the boat to begin surfing. The force of the water displaced by the water diverter causes the rear of the boat to displace so as to create the wake conditions favorable to wakesurfing on a side of the wake opposite to the wake surf system. The pressure of the water against the water diverter is transferred to the base structure through the pivotable connection there between and through the one or more braces disposed there between. This force transferred from the wave diverter to the base structure is further transferred to the connection between the base structure and the bracket affixed to the boat. Due to the front mechanical clasp interconnection of the bracket to the base structure the wake forming assembly is securely held to the bracket. And, due to the rear appendage of the bracket biased against the rear surface of the base structure, the wake forming assembly is prevented from sliding rearward relative to the bracket. Thus, the wake forming assembly is securely held at a desired angle relative to the bracket and hull of the boat during use. The secure connection between the wake forming assembly and the bracket can be accomplished by a combination of mechanical and/or magnetic connection. In some embodiments, the combination of mechanical and magnetic connection assists in inherent alignment and reliable securement of the wake forming assembly to the hull of the boat.

After use, the water diverter can be collapsed relative to the base structure by releasing the one or more braces from the base structure and pivoting the water diverter against the base structure so as to reduce the width and displaceable volume thereof. One or more hand holds can be disposed in the base structure such that the wake forming assembly may be easily grasped and disconnected from the bracket by rotating the wake forming assembly relative to the front clasp of the bracket and away from the rear appendage of the bracket to remove the wake forming assembly from the bracket. Such hand holds can be disposed at a bottom of the base structure so as not to interfere with the flow of water diverted around the wake forming assembly. As such, the wake forming assembly may be placed in storage or made relatively portable for later use. Often it is not recommended to leave the wake forming assembly attached to the boat as it may detach particularly at high speeds. Similarly, adjustment of the angle or replacement of the wake forming assembly on an opposing side of the boat may also be accomplished prior to launch of the boat or while the boat is afloat. Connection of the wake forming assembly to the bracket and removal of the wake forming assembly from the bracket can be accomplished in-water, or prior to launch of the boat.

Figure 1:
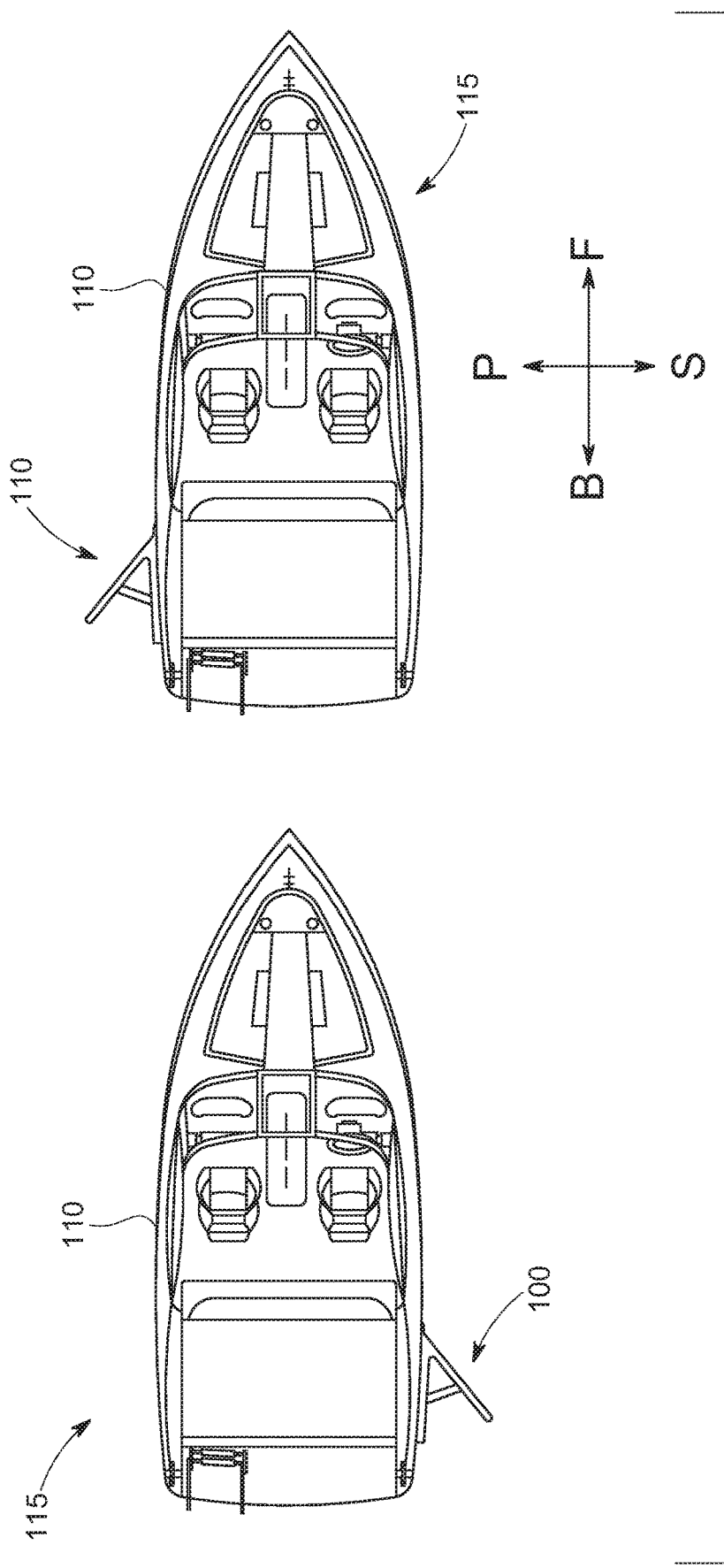
FIG. 1 illustrates a wakesurf system alternatively installed on opposing sides of the hull of a boat.

Referring to FIGS. 1-8, a wakesurf system 100 is shown to illustrate an example of the present invention and various optional components as well as several preferred embodiments thereof. Referring to FIGS. 2-8, the wakesurf system 100 includes a bracket 105 and a wake forming assembly 120. The bracket 105 is configured to be attached to a hull 110 of a boat 115. The collapsible and expandable wake forming assembly 120 is configured to be connectable and disconnectable to the bracket 105. With reference to FIG. 1 the wakesurf system 100 can be connectable to the port ("P") side of the boat 115, and the starboard ("S") side of the boat 115. The boat 115 is also defined by a front ("F") or bow of the boat 115, and a back ("B") or aft of the boat 115. Similarly, as discussed in more detail herein after the components of the wakesurf system 100 can be described relative to the boat to which the wakesurf system 100 is to be attached as referencing a front end ("A") and a back or rear end ("B") of the components of the wakesurf system 100.

Referring to FIGS. 1-8, the wakesurf system 100 can include a wake forming assembly 120 and a bracket 105. The wake forming assembly 120 can include a base structure 125 including a bottom surface having and annular groove 130 and connector including a magnet 170 for attaching the base structure 125 to the bracket 105 when the bracket is attached to the hull 110 of the boat 115. In other embodiments, the bracket 105 can include a magnet and the base structure 125 can include a metallic element for magnetic connection, for example see FIG. 6B.

The wake forming assembly 120 can further include a water diverter 135 pivotably attached at a pivotable joint 127 to a second upper surface of the base structure 125. The wake forming assembly 120, bracket 105, water diverter 135, and base structure 125 can be defined by a front end "A" and a back end "B". The front end "A" can correspond with a bow, fore end, or front "F" of a boat 115 when attached thereto. A back end "B" of the wake forming assembly 120, bracket 105, water diverter 135, and base structure 125 can correspond with a back end, aftend, or stern "B" of a boat 115 when attached thereto. The wake forming assembly 120, bracket 105, water diverter 135, and base structure 125 can be defined by a left side and a right side. When disposed on the left (port) side of the boat 115 the left side of the wake forming assembly 120, bracket 105, water diverter 135, and base structure 125 is directed downwards and the right side is directed upwards as illustrated in FIG. 1. When disposed on the right (starboard) side of the boat 115 the left side of the wake forming assembly 120, bracket 105, water diverter 135, and base structure 125 is directed upwards and the right side thereof is directed downwards.

Figure 4:
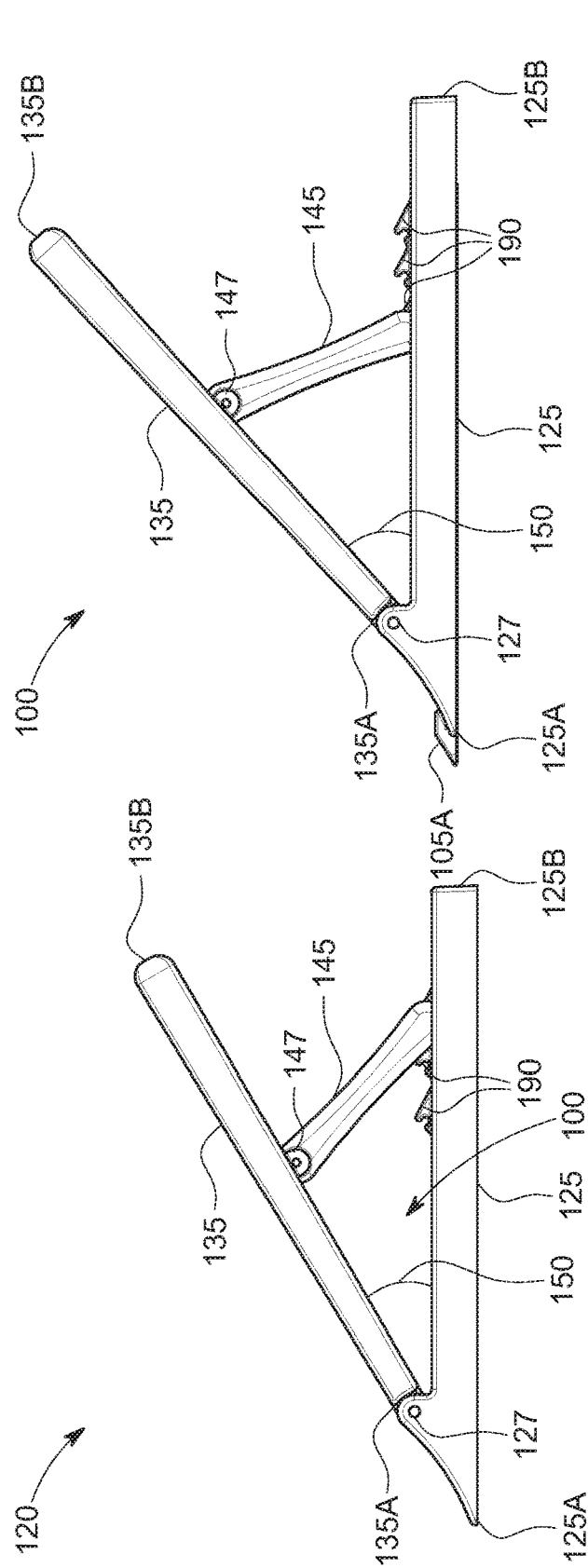
FIG. 4 illustrates the wake forming assembly in two different expanded positions being defined by different angles between a base structure and water diverter.

The wake forming assembly 120 further includes the one or more braces 145 positioned between the base structure 125 and the water diverter 135. The base structure 125 supports the water diverter 135 at an angle 150 to the hull 110 of the boat 115 when the base structure 125 is attached to the bracket 105 and the wake forming assembly 120 is in an expanded position as shown in FIG. 4, for example. The one or more braces 145 are moveable between a plurality of positions. The one or more positions change the angle 150 of the water diverter 135 relative to the base structure 125 by placing the two braces 145 in this example at an angle 150 relative to the base structure 125 and water diverter 135.

Figure 2:
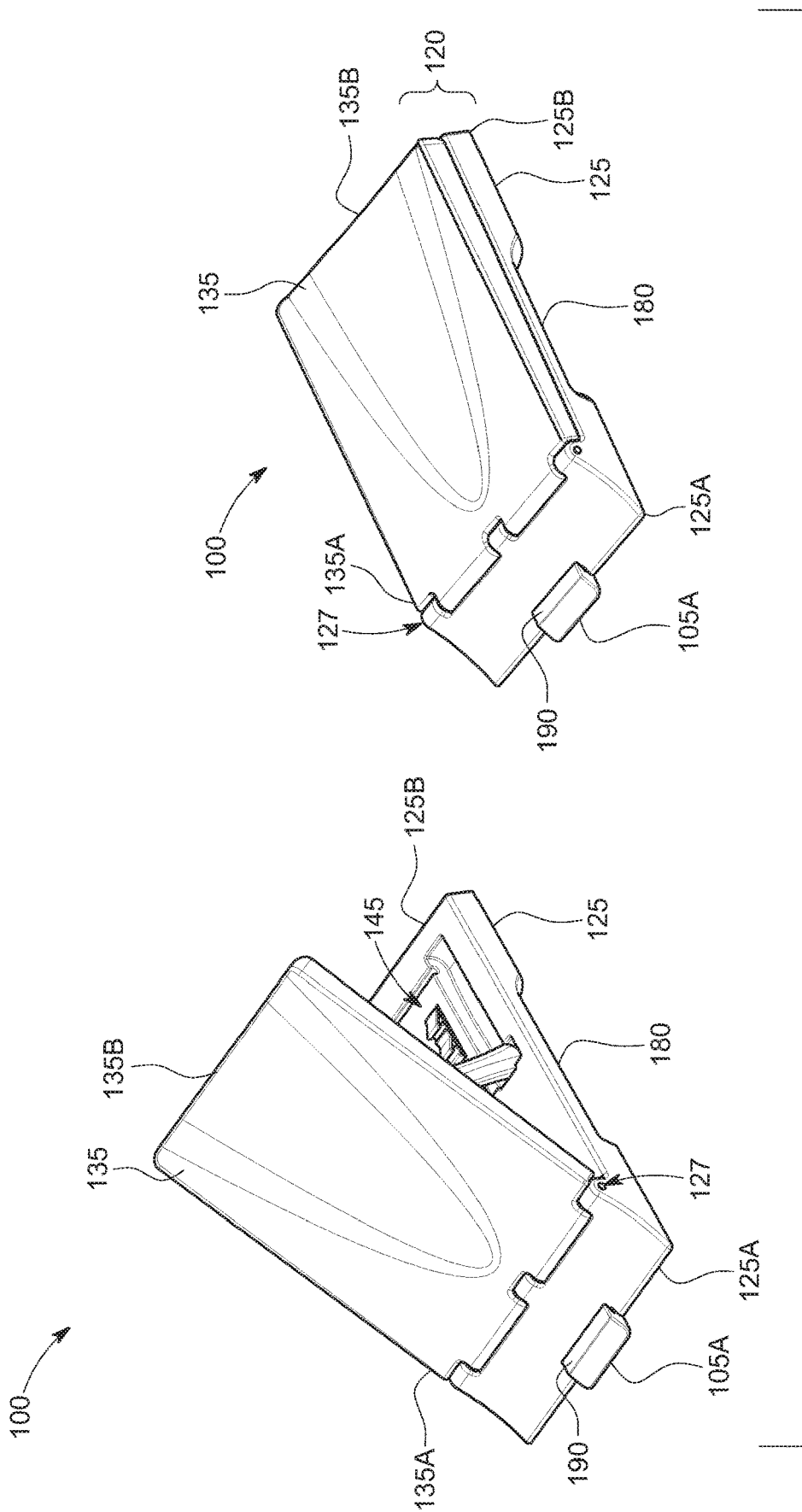
FIG. 2 illustrates the wakesurf system in an expanded position on the left and a collapsed position on the right from front-right-tip perspective views.
Figure 3:
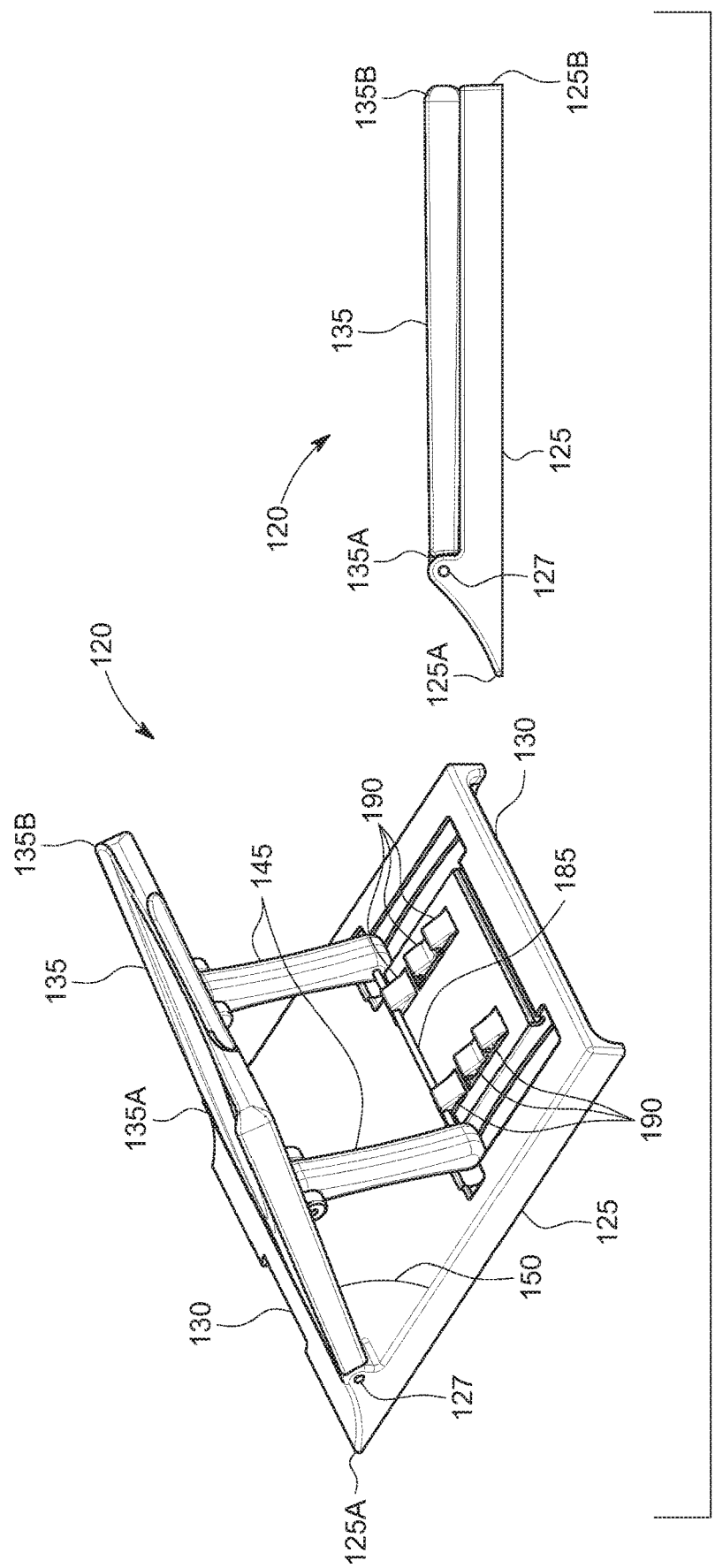
FIG. 3 illustrates a wake forming assembly of the wakesurf system in an expanded rear view on the left and collapsed side view on the right.

The braces 145 are also movable to a collapsed position. In the collapsed position the water diverter 135 is placed flat against the base structure 125 and parallel thereto so as to be disposed in a folded position as shown in FIGS. 2, 3, and 8. As such, the thickness and displaceable volume occupied by the wake forming assembly 120 is substantially reduced. When collapsed, for example, the thickness of the wake forming assembly 120 of the wake surf system 100 can be between 2 and 5 inches according to some embodiments. In the embodiment illustrated in FIGS. 1-8, in the collapsed folded position the thickness of the wake forming assembly 120 can be less than 3 inches according to some embodiments, more specifically can be about 2.25 inches thick. The length of the water diverter 135, as shown, can be between 8 and 24 inches, or can be about 12.5 inches. The length of the base structure can be between about 8 and 24 inches or can be about 15 inches, for example. The width of the water diverter and base support structure can be between 8 and 24 inches, or can be about 10 inches. Larger and smaller examples of one or more components of the wake surf system can vary by any amount such as larger or smaller by 5%, 10%, 20%, 50%, or more and there between.

The braces 145 can include two or more positions that change the angle of the water diverter 135 within a range between 15 and 90 degrees 150 relative to the base structure 125. The change in angle of the braces 145, diverter 135, and base structure 125 relative to one another can vary based on an angle of the braces 145 relative to a pivot 147 pivotably affixed thereto. The pivot 147 can include a pivot joint connection 147 between the one or more braces 147 and the water diverter 135 as illustrated in FIG. 4.

Figure 5:
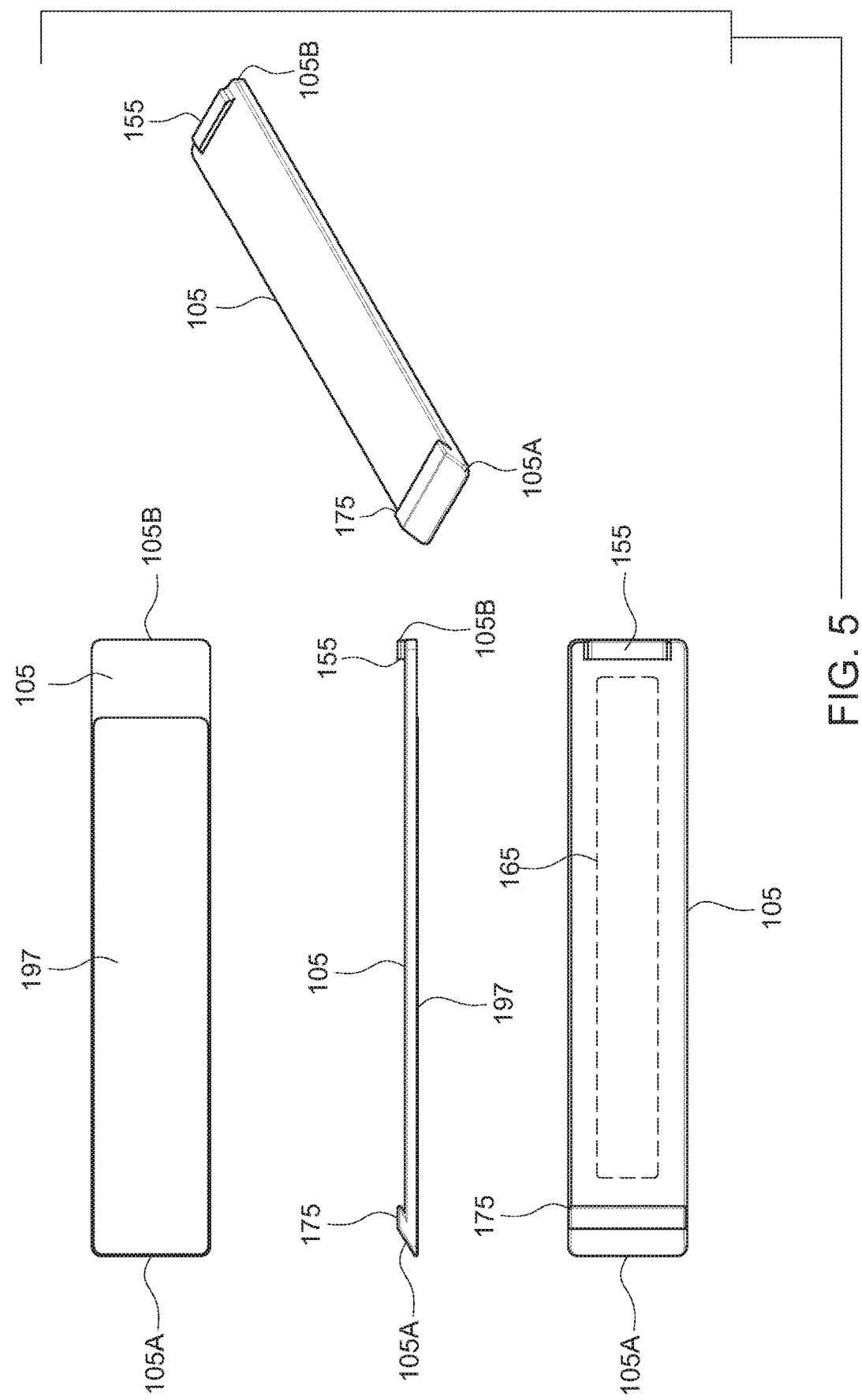
FIG. 5 shows an example of a bracket from top, left (note that right would be reversed yet identical); bottom and front right perspective views.
Figure 6A:
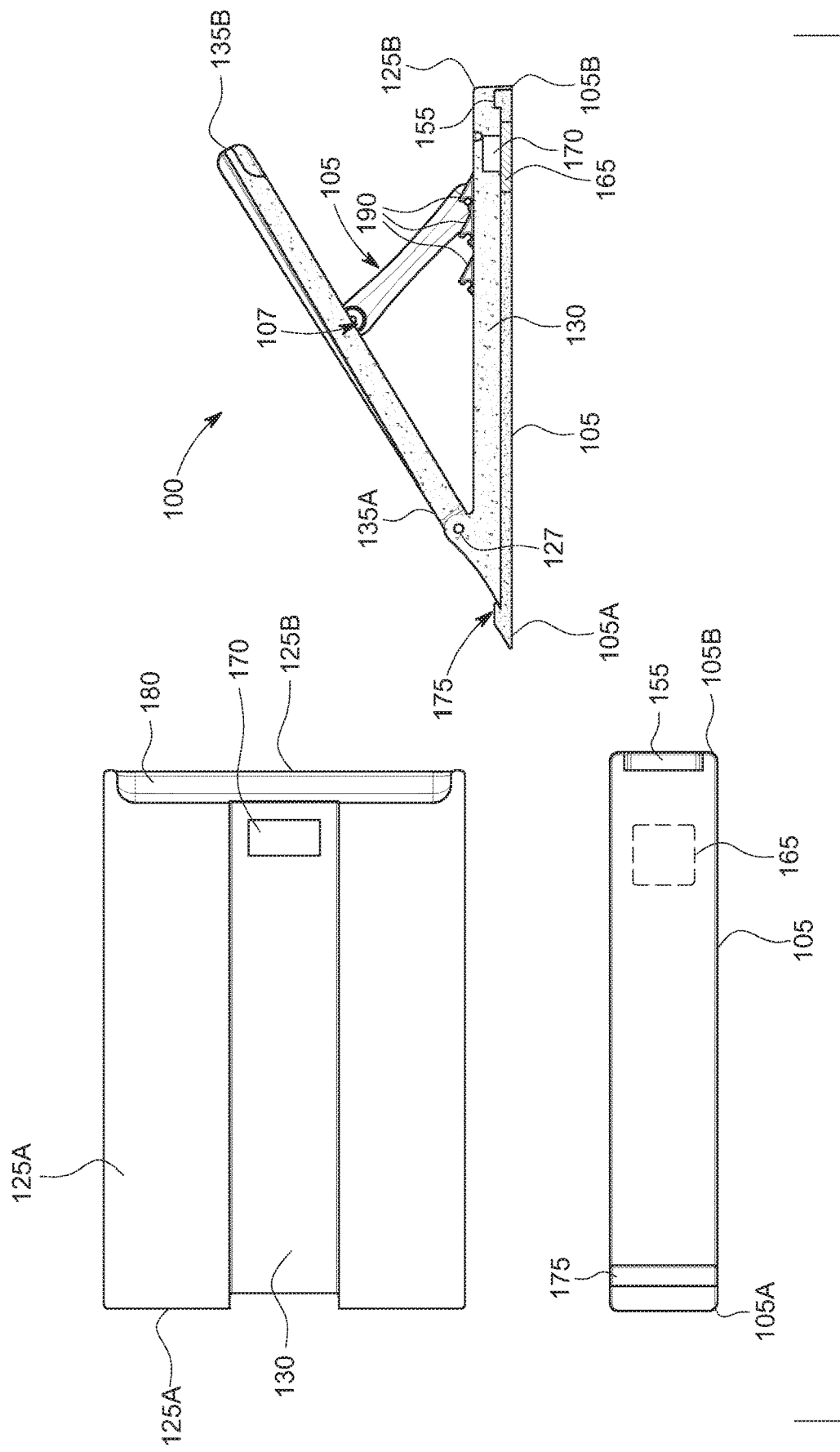
FIG. 6A illustrates the bottom of the base structure at the top-left, the bracket at the bottom-left, and a cross-sectional view of the wakesurf system on the right showing connection of the base structure to the bracket according to an embodiment of the invention.
Figure 6B:
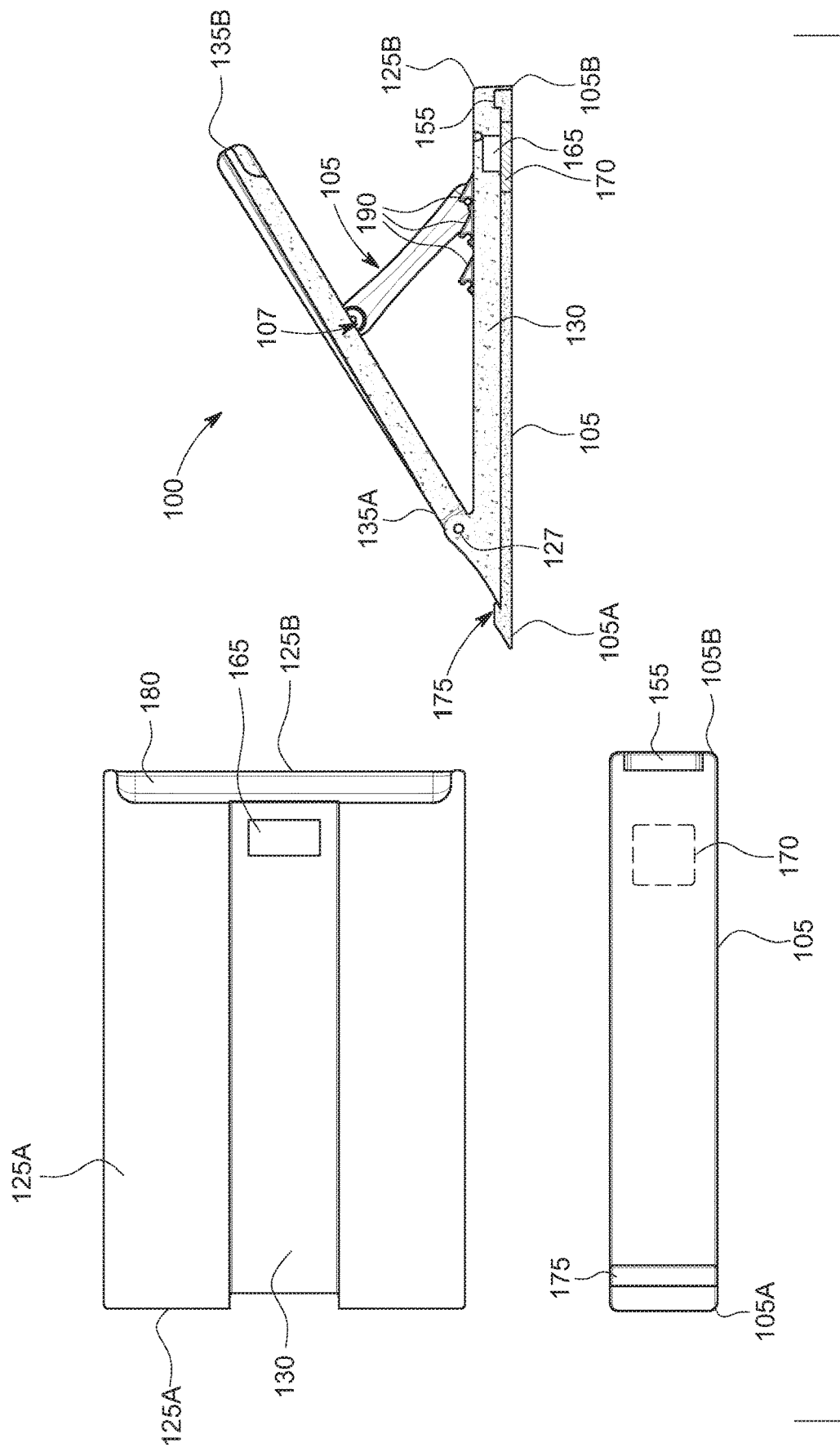

The attachment between the base structure 125 and the brackets 145 can be snap-fit connection, buckle connection, mechanical connector, removable pin, or a magnetic connection, or a combination thereof. Referring to FIGS. 5 and 6A, the connector can include a magnetic connection between the bracket 105 and the base structure 125. The base structure 125 can include a magnet 170 that may be encapsulated therein or disposed relative to the annular groove 160 of the first surface 130. The strut can include a metallic strut 165. The metallic strut can extend a substantial length of the bracket 105 as illustrated in FIG. 5 so as to also provide substantial rigidity thereto. The strut 165 can also be disposed at an end proximate to the location of the corresponding magnet 170 of the base structure 125 as illustrated in FIG. 6. According to other embodiments, various connectors and parts can be reversed. For example, in FIG. 6B the bracket 105 can include the magnet 170 and the base structure 125 can include a metallic element 165 for magnetic connection of the base structure 125 to the bracket 105.

The connection between the bracket 105 and the base structure 125 of the wake forming assembly 120 can further include a mechanical connection. The mechanical connection is in direct contrast to the previous designs discussed in the background of this patent application. The mechanical connection between the bracket 105 and the base structure 125 can include one or more interlocking mechanical features, preferably two or more interlocking and/or biasing features according to some embodiments disclosed herein. As illustrated in FIG. 6 showing a cross-sectional view on the right an interlocking mechanical feature 175 can be disposed at a front edge of the bracket 105. The interlocking mechanical feature 175 fitting around a front and 125A of the base structure 125 such that the front end 125A of the base structure 125 is mechanically secured to the bracket 105 during use in addition to the magnetic connection, for example.

The bracket 105 can further include a rear appendage 155 extending substantially perpendicular to an upper surface of the bracket 105, the rear appendage 155 being biased against a rear end 125B surface of the base structure 125 during use thereby mechanically preventing the base structure 125 from sliding past the appendage 155 during use and under the pressure of diverted water.

The base structure 125 can be manually releasable from the bracket 105 by pivoting the base structure 125 about the front interlocking mechanical feature 175 of the bracket 105 against the magnetic force of the magnetic connection between the strut 165 and magnet 170, thereby disengaging and releasing the base structure 125 from the rear appendage 125 and allowing the base structure 125 to be removed from interlocking mechanical feature 175 disposed at the front edge 105A of the bracket 105. Thus, the bracket 105 including a metallic strut 165 and the base structure 125 including the magnet 170 are configured for temporarily connecting the bracket 105 to the base structure 125 and securely holding the base structure 125 thereto due to the biased mechanical support of the appendage 155 to the rear surface 125B of the base support 125. As previously mentioned, the metallic strut of the bracket can be, but may not be, encapsulated in a plastic formed over the metallic strut. Similarly, the base structure can encapsulate the magnet for releasably connecting the base structure to the bracket.

FIG. 2 illustrates an embodiment of the wake surf system 100 in a front expanded state on the left and a collapsed state on the right. Similarly, FIG. 3 illustrates the wake surf system 100 in a rear expanded perspective view on the left and a left side collapsed view on the right. FIG. 4 illustrates the wake surf system 100 from a left side view expanded at different angles of expansion for diverting water at different angles 150 relative to a hull of a boat. FIG. 5 illustrates a bracket 105 of the wake surf system 100 from top, left side, top, and front-left perspective views. FIGS. 6A and 6B illustrate a bottom view of a base structure 125 and top view of a bracket 105 on the left and a cross-sectional view of the wake surf system 100 on the right. FIG. 7 illustrates an open front view of the wake surf system 100 on the left and a rear-right perspective view of the wake surf system 100 on the right. FIG. 8 illustrates a rear expanded view of the wake forming assembly on the left and a rear collapsed view of the wake forming assembly 120 on the right.

FIG. 9 illustrates an alternative embodiment of a wake surf system 200 using a rear mechanical connector between a base structure 225 and a bracket 271. The rear mechanical connector includes a latch 266 connected by a pivot 268 to a base structure 225 of a wake forming assembly 220. The latch 266 can include an interlocking surface 267 directly engaging a complementary interlocking appendage 272 of the bracket 271. This embodiment can have a similar forward facing interlocking mechanical feature as previously described with reference to FIGS. 2-8.

Similarly, the embodiment illustrated in FIG. 9 includes the wakesurf system 200 can include a wake forming assembly 220 and the bracket 205. The wake forming assembly 220 can include the base structure 225 including a bottom surface having an annular groove and connector including the latch 266 for attaching the base structure 225 to the bracket 271 when the bracket 271 is attached to the hull 110 of the boat 115 (see FIG. 1). The wake forming assembly 220 can further include a water diverter 235 pivotably attached at a pivotable joint 227 to a second upper surface of the base structure 225. The wake forming assembly 220, bracket 271, water diverter 235, and base structure 225 are shown from a rear end view thereof in FIG. 9. The view on the left is in an expanded state and the view on the right is illustrated in a collapsed state.

The wake forming assembly 220 further includes the one or more braces 245 positioned between the base structure 225 and the water diverter 235. The base structure 225 supports the water diverter 235. The one or more braces 245 are moveable between a plurality of positions. The one or more positions change the angle of the water diverter 235 relative to the base structure 225 by placing the two braces 245 at an angle relative to the base structure 225 and water diverter 235. Similarly, the underside of the diverter shown on the left of FIG. 9 illustrate handles 280, a brace connector 285, pivot connections 227 and 247, and recessions 296 for accommodating the braces 245 and latches 290 in the collapsed state shown in the right in FIG. 9.

FIG. 10 illustrates an example of a wakesurf system including a wake forming assembly 120 and two brackets 105. The brackets are similarly configured for application to opposing sides of the hull 110 of a boat 115. The wake forming assembly 120 can be interchangeably attached to, and detached from, the brackets 105 applied to the port P and starboard S sides of the boat 115 as illustrated in FIG. 1 and discussed in further detail herein.

Referring to FIGS. 11-18, methods of using and assembling an embodiment of a wakesurf system 100 are illustrated. Various advantages and benefits thereof are further illustrated therein. The wakesurf system 100 can provide for improvements in methods of use including simplified and intuitive connection to, and disconnection from, the hull 110 of a boat 115 as illustrated in FIGS. 11-18. This intuitive connection can be further enhanced using the magnetic attraction and connection between complementing components thereof. Connection of wake forming assembly 120 to the bracket 105 disposed on the hull 110 of the boat 115 may be easily accomplished prior to launching the boat 115, or while the boat 115 is afloat as more specifically illustrate in FIGS. 15 and 17. Preferably, the wake forming assembly 120 should only be attached once the boat 115 is in the water, not prior to launching the boat 115. The wakesurf system 100 can be substantially portable and collapsible prior to, and after, use as compared to other devices as more specifically illustrated in FIG. 18.

Figure 11:
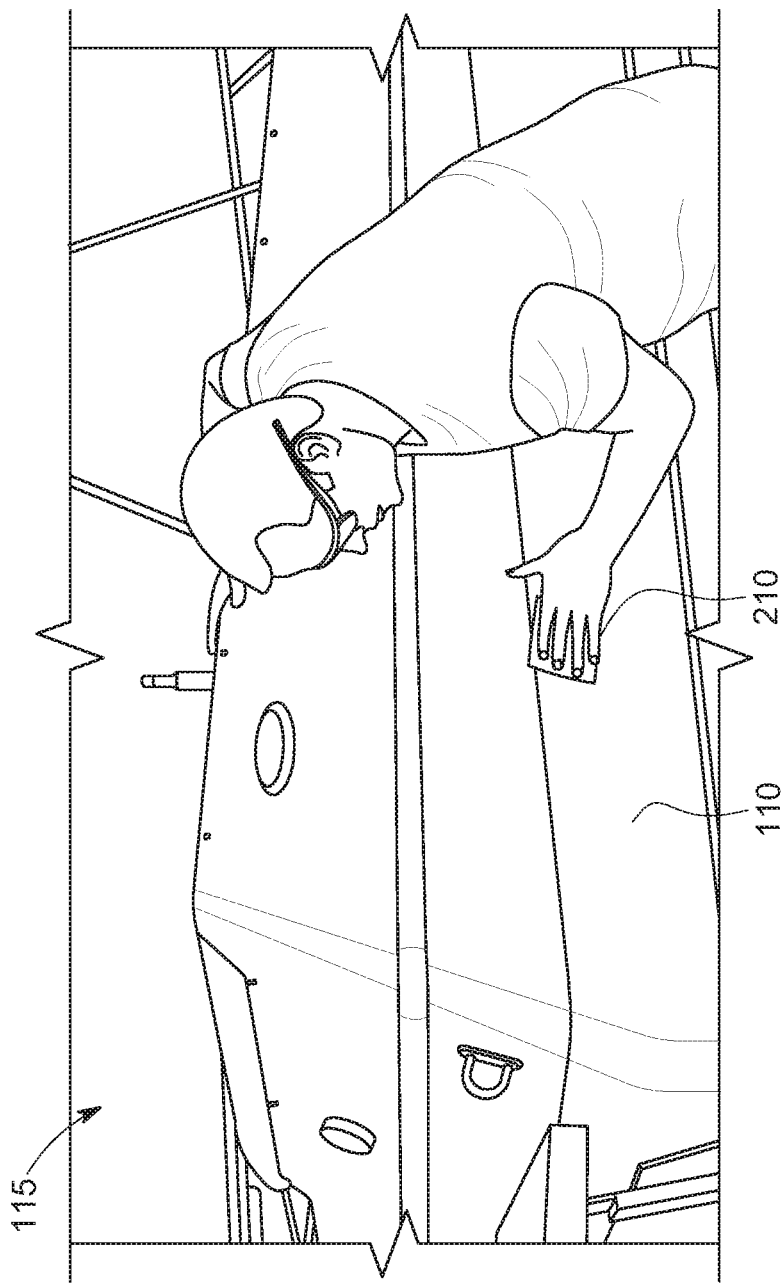
Figure 12:
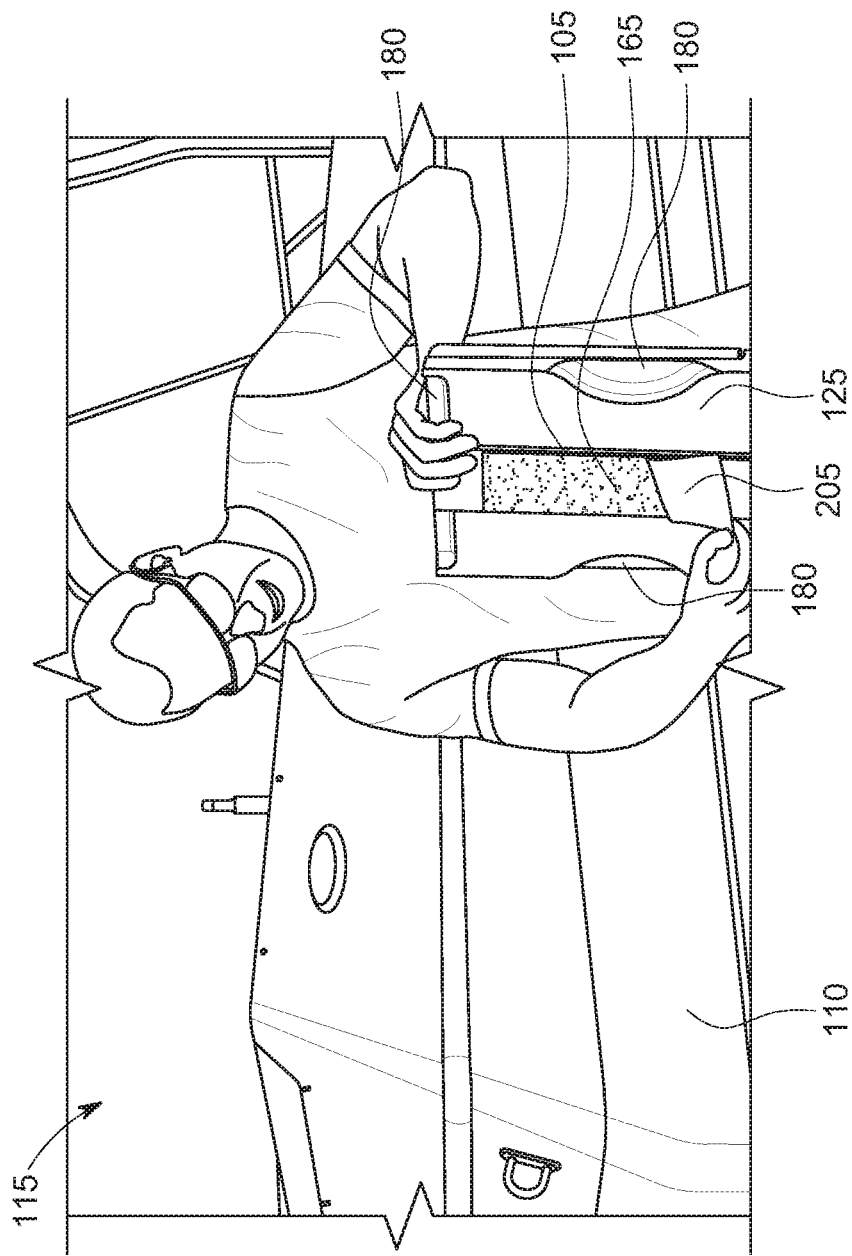
Figure 13:
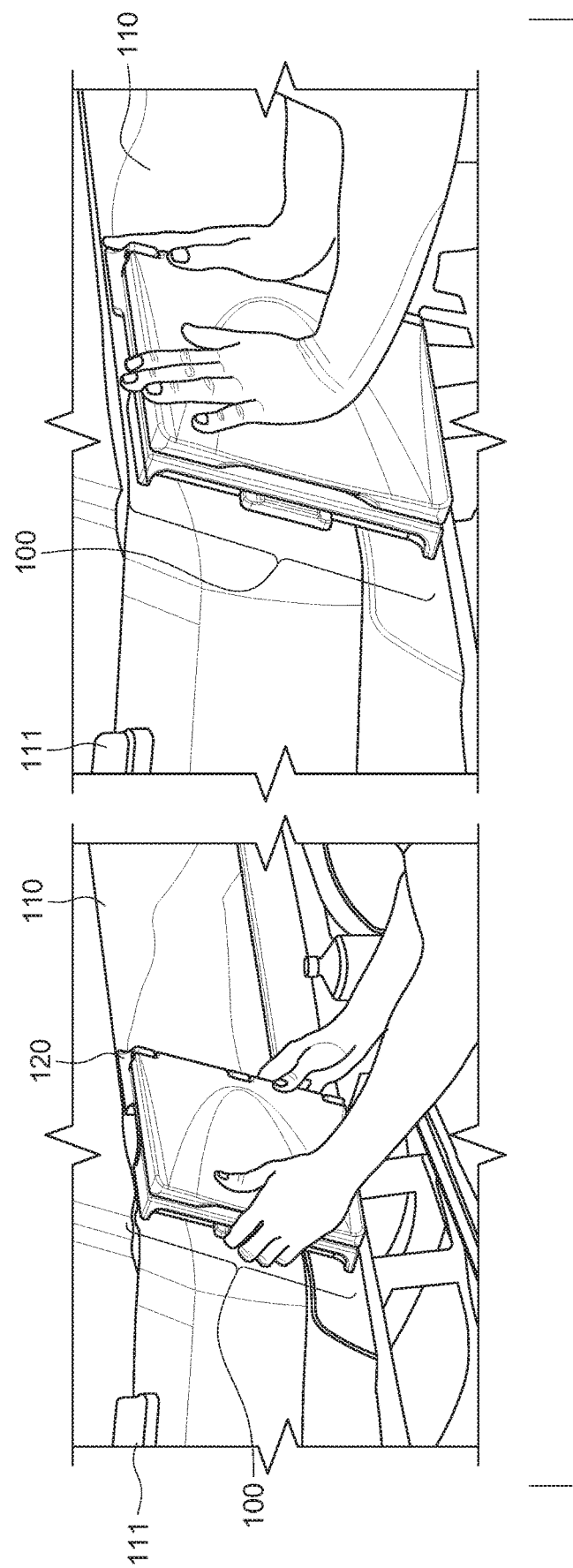
Figure 14:
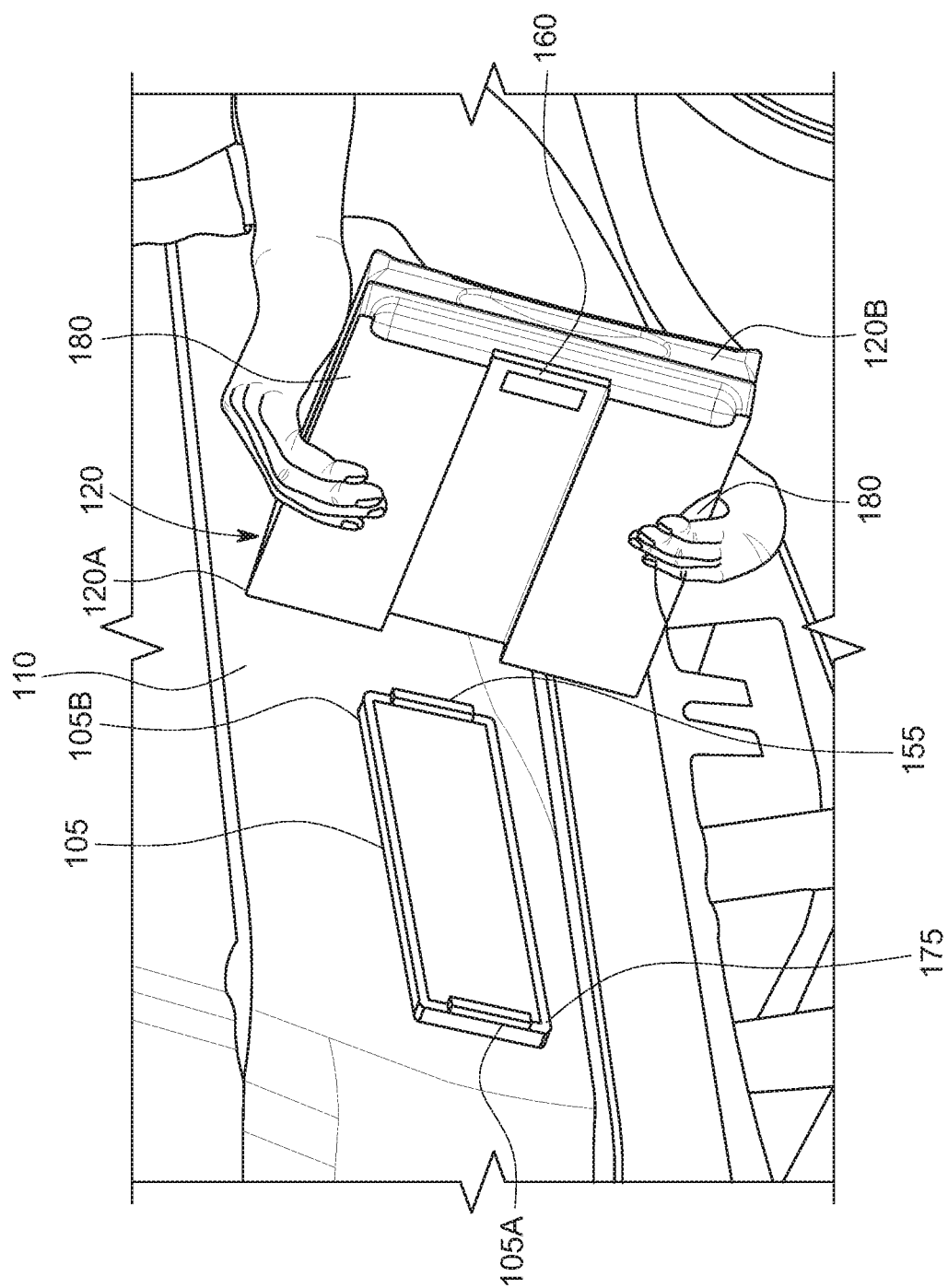

The wakesurfing system 100 can include two brackets 105 for connection to opposing sides (i.e. port and starboard sides) of a boat 115 as more specifically illustrated in FIGS. 11-14. As illustrated in FIG. 11, an alcohol pad 210 may be used to clean the side of the hull 110 of the boat 115. As illustrated in FIG. 12, a non-stick paper 205 may be removed from the double sided tape 165 disposed on a bottom surface of the bracket 105. As illustrated in FIG. 13, the bracket may be place with respect to a waterline of the boat when afloat. The waterline of the boat may be considered relative to a swim platform 111 of the boat 115, for example. After the wakesurf system 100 including the bracket 105 is properly placed the wake forming assembly 120 can be removed from the bracket leaving the bracket affixed to the hull 110 of the boat 115 as shown in FIG. 14. A similar process of FIGS. 11-14 can be conducted to apply the second bracket 105 to the opposite side, in this case the port side, of the hull 110 of the boat 115.

As shown in FIG. 15, the wake forming assembly 120 can be interchangeably connected to one of each of the two brackets 105 on opposing sides of the hull 110 of the boat 115 while the boat 115 is afloat. The angle of the water diverter 135 relative to the base structure 125 of the wake forming assembly 120 can also be adjusted prior to, or when the boat 115 is afloat, for modifying the attributes of the wake for wake surfing.

Use of the wakesurf system can drastically improve the conditions of the wake. To further illustrate, FIG. 16 shows a wakesurfer enjoying the improved conditions of a wake 310 characteristic due to use of the innovative wakesurf system 100 disclosed herein.

FIG. 17 illustrates removal, or attachment, of the wake forming assembly 120 from, or to, the bracket 105 adhered to the hull 110 of the boat 115 while afloat. According to some other embodiments, the bracket 105 may be integrated with the hull or attached in a different manner thereto in addition to or in place of adhesion, such as using bolts, screws, latches, dovetail connections, and other mechanically connectable features.

Referring to FIG. 18 the wake forming assembly 120 is shown being collapsed and stowed in a seat compartment 400 of the boat 115. As previously mentioned, portions of the wakesurf system 100 can be manufactured from a formed polyurethane, as opposed to being injection molded, so as to float. This buoyant attribute can allow the wake forming assembly 120, for example, to float if dropped or accidentally detached from the bracket and into the water, for example when being attached in FIG. 15 or while being detached in FIG. 17.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 parts refers to groups having 1, 2, or 3 parts. Similarly, a group having 1-5 parts refers to groups having 1, 2, 3, 4, or 5 parts, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wakesurf system, comprising:
a bracket configured to be attached to a hull of a boat, the bracket including a metallic element; and;
a collapsible and expandable wake forming assembly including:
a base structure including a magnet for attaching the base structure to the bracket when attached to the hull of the boat;
a water diverter pivotably attached to the base structure; and
one or more braces positioned between the base structure and the water diverter, wherein the base structure supports the water diverter at an angle to the hull of the boat when the base structure is attached to the bracket and the collapsible and expandable wake forming assembly is in an expanded position, wherein the one or more braces are moveable between a plurality of positions that change the angle of the water diverter within a range between 15 and 90 degrees relative to the base structure.

2. The wakesurf system as claimed in claim 1, wherein each position changes the angle of the water diverter relative to the base structure.

3. The wakesurf system as claimed in claim 1, wherein the one or more braces are movable to a collapsed position, in the collapsed position the water diverter being placed against the base structure and parallel thereto.

4. The wakesurf system as claimed in claim 1, further comprising an interlocking mechanical feature disposed at a front edge of the bracket, the interlocking mechanical feature fitting around a front of the base structure such that the front of the base structure is mechanically secured to the bracket during use.

5. The wakesurf system as claimed in claim 4, the bracket further comprising a rear appendage extending substantially perpendicular to an upper surface of the bracket, the rear appendage being biased against a rear end surface of the base structure during use.

6. The wakesurf system as claimed in claim 5, the base structure being releasable from the bracket by pivoting the base structure about the front interlocking mechanical feature of the bracket against the magnetic force of the magnetic connection, thereby releasing the base structure from the rear appendage and allowing the base structure to be removed from the interlocking mechanical feature disposed at the front of the bracket.

7. A method of installing the wakesurf system as claimed in claim 1, comprising:
adhering the bracket to the hull of the boat; and
connecting the collapsible and expandable wake forming assembly to the bracket.

8. A method of installing the wakesurf system according to claim 7, the bracket including a interlocking mechanical feature for mechanically connecting the bracket to the base structure of the collapsible and expandable wake forming assembly.

9. A wakesurf system, comprising:
a bracket configured to be attached to a hull of a boat, including:
a metallic strut;
a mechanical interlocking mechanical feature; and
a rear appendage;
a collapsible and expandable wake forming assembly including:
a base structure including:
a portion configured to mate with the interlocking mechanical feature of the bracket;
a magnet configured to mate with the metallic strut thereby aligning and holding the base structure against the bracket when placed thereto;
a rear surface configured to be placed and biased against the rear appendage of the bracket during use;
a water diverter pivotably attached to the base structure; and
one or more braces positioned between the base structure and the water diverter, wherein the base structure supports the water diverter at an angle to the hull of the boat when the base structure is attached to the bracket and the collapsible and expandable wake forming assembly is in an expanded position.

10. The wakesurf system as claimed in claim 9, wherein the one or more braces are moveable between a plurality of positions and each position changes the angle of the water diverter relative to the base structure.

11. The wakesurf system as claimed in claim 10, wherein the one or more braces are movable to a collapsed position, in the collapsed position, the water diverter being placed against the base structure and parallel thereto thereby substantially reducing a width and displaceable volume of the wake forming assembly for storage.

12. A wakesurf system, comprising:
a bracket configured to be attached to a hull of a boat;
a collapsible and expandable wake forming assembly including:
a base structure including a magnet or a latch for attaching the base structure to the bracket when attached to the hull of the boat;
a water diverter pivotably attached to the base structure; and
one or more braces positioned between the base structure and the water diverter, wherein the base structure supports the water diverter at an angle to the hull of the boat when the base structure is attached to the bracket and the collapsible and expandable wake forming assembly is in an expanded position.

13. The wakesurf system as claimed in claim 12, the base structure including the magnet or latch for releasably connecting the base structure to the bracket.

* * * * *